United States Patent
Kakeno et al.

(10) Patent No.: US 9,873,351 B2
(45) Date of Patent: Jan. 23, 2018

(54) FUEL CELL SYSTEM, FUEL CELL VEHICLE, AND METHOD OF CONTROLLING FUEL CELL SYSTEM

(71) Applicant: TOYOTA JIDOSHA KABUSHIKI KAISHA, Toyota-shi, Aichi-ken (JP)

(72) Inventors: Yuji Kakeno, Nisshin (JP); Mitsuhiro Nada, Toyota (JP); Kenji Umayahara, Miyoshi (JP); Yusuke Nishida, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/647,434

(22) Filed: Jul. 12, 2017

(65) Prior Publication Data

US 2017/0305296 A1    Oct. 26, 2017

Related U.S. Application Data

(62) Division of application No. 14/926,254, filed on Oct. 29, 2015, now Pat. No. 9,776,526.

(30) Foreign Application Priority Data

Nov. 14, 2014  (JP) .................................. 2014-231646
May 26, 2015  (JP) .................................. 2015-106092

(51) Int. Cl.
*B60L 11/18*   (2006.01)
*H01M 8/04537*  (2016.01)
(Continued)

(52) U.S. Cl.
CPC ....... *B60L 11/1887* (2013.01); *B60L 11/1861* (2013.01); *H01M 8/0494* (2013.01);
(Continued)

(58) Field of Classification Search
CPC .......................... B60L 11/1887; H01M 10/486
(Continued)

(56) References Cited

U.S. PATENT DOCUMENTS

| 8,018,196 B2 | 9/2011 | Sugiura et al. |
| 2002/0192519 A1 | 12/2002 | Fujita |

(Continued)

FOREIGN PATENT DOCUMENTS

| JP | 2003-197210 | 7/2003 |
| JP | 2009-231223 | 10/2009 |

(Continued)

*Primary Examiner* — Kawing Chan
(74) *Attorney, Agent, or Firm* — Finnegan, Henderson, Farabow, Garrett & Dunner, LLP

(57) ABSTRACT

A fuel cell system to be installed on a vehicle includes a fuel cell, a secondary battery, an SOC detector that detects a temperature and a state of charge of the secondary battery, an accelerator position detector that detects an accelerator depressed amount, and a controller that controls power to be generated by the fuel cell. The controller includes: a required generation power calculator that calculates required generation power based on the accelerator depressed amount and the temperature and the state of charge of the secondary battery; and a maximum required power calculator that calculates maximum required power based on the accelerator depressed amount and the temperature and the state of charge of the secondary battery. The maximum required power includes allowable charging power correlated with a maximum value of charging power. If determining that a condition for rapid reduction in consumption power of a motor is satisfied, the controller sets the allowable charging power to zero and calculates the maximum required power. If the required generation power exceeds the maximum required power, the controller makes the fuel cell generate power responsive to the maximum required power.

7 Claims, 14 Drawing Sheets

(51) Int. Cl.
    *H01M 8/0432*     (2016.01)
    *H01M 8/04828*     (2016.01)
    *H01M 16/00*     (2006.01)
    *H01M 10/48*     (2006.01)

(52) U.S. Cl.
    CPC ... *H01M 8/04373* (2013.01); *H01M 8/04626* (2013.01); *H01M 16/006* (2013.01); *H01M 10/486* (2013.01); *H01M 2250/402* (2013.01); *Y02B 90/12* (2013.01); *Y02T 10/705* (2013.01); *Y02T 10/7044* (2013.01); *Y02T 90/34* (2013.01)

(58) Field of Classification Search
    USPC .......................................................... 318/139
    See application file for complete search history.

(56) References Cited

U.S. PATENT DOCUMENTS

| | | |
|---|---|---|
| 2007/0163540 A1 | 7/2007 | Tomatsuri |
| 2009/0105895 A1 | 4/2009 | Shige |
| 2011/0014536 A1 | 1/2011 | Yoshida |
| 2011/0293972 A1 | 12/2011 | Naganuma |
| 2012/0007543 A1 | 1/2012 | Chou |
| 2012/0007545 A1 | 1/2012 | Yoshida et al. |
| 2012/0021257 A1 | 1/2012 | Yoshida et al. |
| 2013/0226389 A1 | 8/2013 | Yamazaki |
| 2013/0323540 A1 | 12/2013 | Matsusue |

FOREIGN PATENT DOCUMENTS

| | | |
|---|---|---|
| JP | 2010-238528 | 10/2010 |
| JP | 2010-238530 | 10/2010 |
| JP | 2011-15580 | 1/2011 |

FUEL CELL SYSTEM, FUEL CELL VEHICLE, AND METHOD OF CONTROLLING FUEL CELL SYSTEM

CROSS REFERENCE TO RELATED APPLICATIONS

This is a divisional of application Ser. No. 14/926,254, filed on Oct. 29, 2015, which claims priority based on Japanese Patent Application No. 2014-231646 filed on Nov. 14, 2014 and Japanese Patent Application No. 2015-106092 filed on May 26, 2015, the disclosure of each of which is incorporated herein by reference in its entirety.

BACKGROUND

Field

This invention relates to a fuel cell system to be installed on a vehicle, a fuel cell vehicle, and a method of controlling the fuel cell system.

Related Art

In a conventionally-known fuel cell system to be installed on a vehicle, required generation power (command power) of a fuel cell is calculated in response to the amount of depression of an accelerator and the amount of oxygen and the amount of hydrogen to be supplied to the fuel cell are controlled in a manner such that power generated by the fuel cell becomes the same as the command power (JP2011-15580A). This fuel cell system reduces the command power of the fuel cell in response to reduction in consumption power of a motor caused during deceleration of a vehicle, for example.

If the consumption power of the motor is reduced rapidly by rapid reduction in the amount of depression of the accelerator, for example, a temporal delay occurs until power generated by the fuel cell is reduced to respond to the rapid reduction in the consumption power. An excess of power generated during the delay is supplied to a secondary battery, causing a problem of overcharge of the secondary battery.

SUMMARY

This invention has been made to solve the aforementioned problem. This invention can be implemented in the following aspects.

(1) According to one aspect of this invention, a fuel cell system to be installed on a vehicle is provided. This fuel cell system includes: a fuel cell that supplies power to a motor that drives the vehicle; a secondary battery that supplies power to the motor; an SOC detector that detects a temperature and a state of charge of the secondary battery; an accelerator position detector that detects an accelerator depressed amount of the vehicle; and a controller that controls power to be generated by the fuel cell. The controller includes: a required generation power calculator that calculates required generation power to be issued as a command to the fuel cell based on the accelerator depressed amount and the temperature and the state of charge of the secondary battery; and a maximum required power calculator that calculates maximum required power capable of being generated by the fuel cell based on the accelerator depressed amount and the temperature and the state of charge of the secondary battery. The maximum required power includes allowable charging power calculated based on the temperature and the state of charge of the secondary battery. The controller is configured to determine whether a predetermined condition as a condition for rapid reduction in consumption power of the motor is satisfied, to set the allowable charging power at zero and calculate the maximum required power if determining that the condition is satisfied, to calculate the maximum required power using the allowable charging power calculated based on the temperature and the state of charge of the secondary battery if determining that the condition is not satisfied, and to make the fuel cell generate power responsive to the calculated maximum required power if the calculated required generation power exceeds the calculated maximum required power. According to this configuration, if the consumption power of the motor is to be reduced rapidly, the allowable charging power of the secondary battery becomes zero to reduce the maximum required power (command power) of the fuel cell. Thus, power to be generated by the fuel cell can be reduced readily. This can reduce the occurrence of overcharge of the secondary battery during rapid reduction in the consumption power of the motor.

(2) In the fuel cell system of the aforementioned aspect, the predetermined condition may be satisfied if a reduction rate of the accelerator depressed amount becomes the same as or larger than a first threshold. This configuration makes it possible to detect a state easily where rapid reduction in the consumption power of the motor occurs.

(3) In the fuel cell system of the aforementioned aspect, the predetermined condition is satisfied if a shift position of the vehicle is changed from a drive position to a neutral position and the power generated by the fuel cell becomes the same as or larger than a second threshold. This configuration makes it possible to detect a state easily where rapid reduction in the consumption power of the motor occurs.

(4) According to a different aspect of this invention, a fuel cell system to be installed on a vehicle is provided. This fuel cell system includes: a fuel cell that supplies power to a motor that drives the vehicle; a secondary battery that supplies power to the motor; an SOC detector that detects a temperature and a state of charge of the secondary battery; an accelerator position detector that detects an accelerator depressed amount of the vehicle; and a controller that calculates required generation power to be issued as a command to the fuel cell based on the accelerator depressed amount and the temperature and the state of charge of the secondary battery. The required generation power includes charging power calculated in response to the temperature and the state of charge of the secondary battery. The controller is configured to determine whether a predetermined condition as a condition for rapid reduction in consumption power of the motor is satisfied, to set the charging power calculated based on the temperature and the state of charge of the secondary battery at zero and calculate the required generation power if determining that the condition is satisfied, and to calculate the required generation power using the charging power calculated based on the temperature and the state of charge of the secondary battery if determining that the condition is not satisfied. According to this configuration, if the consumption power of the motor is to be reduced rapidly, the charging power included in the required generation power (command power) becomes zero to reduce the required generation power of the fuel cell. Thus, power to be generated by the fuel cell can be reduced readily. This can reduce the occurrence of overcharge of the secondary battery during rapid reduction in the consumption power of the motor.

(5) According to a different aspect of this invention, a fuel cell system to be installed on a vehicle is provided. This fuel cell system includes: a fuel cell that supplies power to a motor that drives the vehicle; a secondary battery that supplies power to the motor; an SOC detector that detects a temperature and a state of charge of the secondary battery; an accelerator position detector that detects an accelerator depressed amount of the vehicle; and a controller that controls power to be generated by the fuel cell. The controller includes: a required generation power calculator that calculates required generation power to be issued as a command to the fuel cell based on the accelerator depressed amount and the temperature and the state of charge of the secondary battery; and a maximum required power calculator that calculates maximum required power capable of being generated by the fuel cell based on the accelerator depressed amount and the temperature and the state of charge of the secondary battery. The maximum required power includes allowable charging power calculated based on the temperature and the state of charge of the secondary battery and a correction factor. The controller is configured to determine whether a predetermined condition as a condition for rapid reduction in consumption power of the motor is satisfied, to reduce the allowable charging power by making the correction factor smaller than the correction factor of a case where the condition is not satisfied and calculate the maximum required power if determining that the condition is satisfied, to increase the allowable charging power by making the correction factor larger than the correction factor of a case where the condition is satisfied and calculate the maximum required power if determining that the condition is not satisfied, and to make the fuel cell generate power responsive to the calculated maximum required power if the calculated required generation power exceeds the calculated maximum required power. According to this configuration, if the consumption power of the motor is to be reduced rapidly, the allowable charging power of the secondary battery is reduced to reduce the maximum required power (command power). Thus, power to be generated by the fuel cell can be reduced readily. This can reduce the occurrence of overcharge of the secondary battery during rapid reduction in the consumption power of the motor.

(6) In the fuel cell system of the aforementioned aspect, the predetermined condition may be satisfied if braking force of the vehicle generated by application of a brake becomes larger than driving force of the vehicle generated by the motor. This configuration makes it possible to detect a state easily where rapid reduction in the consumption power of the motor occurs.

(7) In the fuel cell system of the aforementioned aspect, if the accelerator depressed amount is the same as or smaller than a predetermined value while the condition is determined to be satisfied, the controller may make the correction factor larger than the correction factor of a case where the accelerator depressed amount is larger than the predetermined value. In this configuration, even if the accelerator depressed amount is small, increase in potential of the fuel cell can still be suppressed by reducing power to be generated by the fuel cell.

This invention can be implemented in various aspects. For example, this invention can be implemented in aspects such as a vehicle on which a fuel cell is installed, a method of controlling a fuel cell system to be installed on a vehicle, a controller that executes the control method, a computer program that executes the control method, and a recording medium storing the computer program.

DESCRIPTION OF THE EMBODIMENTS

A. First Embodiment

Figure 1:
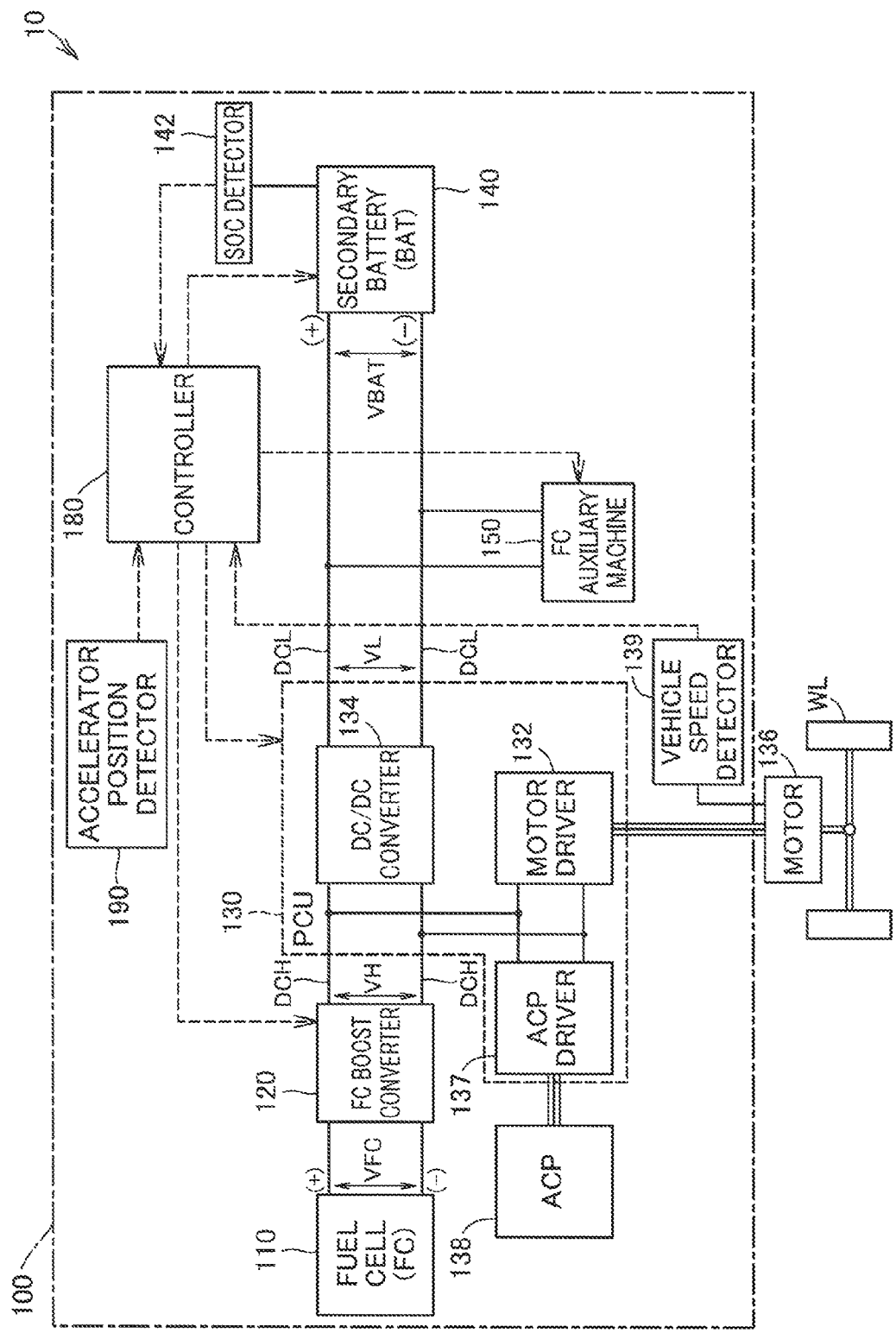
FIG. 1 shows the outline of a fuel cell vehicle on which a fuel cell system of a first embodiment is installed.

FIG. 1 shows the outline of the configuration of a fuel cell vehicle 10 on which a fuel cell system 100 of a first embodiment is installed. The fuel cell vehicle 10 includes a fuel cell 110, an FC boost converter 120, a power control unit (PCU) 130, a traction motor 136, an air compressor (ACP) 138, a vehicle speed detector 139, a secondary battery 140, an SOC detector 142, an FC auxiliary machine 150, a controller 180, an accelerator position detector 190, and wheels WL. The fuel cell vehicle 10 travels while driving the traction motor 136 with power supplied from the fuel cell 110 and the secondary battery 140. The fuel cell system 100 is formed of these functional portions of the fuel cell vehicle 10 except the traction motor 136 and the wheels WL.

The fuel cell 110 is a polymer electrolyte fuel cell that generates power in response to receipt of hydrogen and oxygen supplied as reactive gas. Not only the polymer electrolyte fuel cell but also different types of fuel cells are usable as the fuel cell 110. The fuel cell 110 is connected to a high-voltage DC line DCH through the boost converter 120. The fuel cell 110 is connected to a motor driver 132 and an ACP driver 137 in the PCU 130 through the high-voltage DC line DCH. The FC boost converter 120 boosts an output voltage VFC of the fuel cell 110 to a high voltage VH that can be used by the motor driver 132 and the ACP driver 137.

The motor driver 132 is formed of a three-phase inverter circuit and connected to the traction motor 136. The motor driver 132 converts output power of the fuel cell 110 supplied to the motor driver 132 through the FC boost converter 120 and output power of the secondary battery 140 supplied to the motor driver 132 through a DC/DC converter 134 to three-phase AC power, and supplies the resultant three-phase AC power to the traction motor 136. The traction motor 136 is formed of a synchronous motor with a three-phase coil. The traction motor 136 drives the wheels WL through a gear, etc. During braking of the fuel cell vehicle 10, the traction motor 136 also functions as a power generator that generates regenerative power by regenerating the kinetic energy of the fuel cell vehicle 10. The vehicle speed detector 139 detects a vehicle speed $S_{VHCL}$ [km/h] of the fuel cell vehicle 10 and transmits the detected speed to the controller 180.

The DC/DC converter 134 adjusts the voltage level of the high-voltage DC line DCH in response to a driving signal from the controller 180 and switches the state of the secondary battery 140 between charging and discharging. If the traction motor 136 generates regenerative power, the regenerative power is converted to DC power by the motor driver 132 and supplied to the secondary battery 140 through the DC/DC converter 134.

The ACP driver 137 is formed of a three-phase inverter circuit and connected to the ACP 138. The ACP driver 137 converts output power of the fuel cell 110 supplied to the ACP driver 137 through the FC boost converter 120 and output power of the secondary battery 140 supplied to the ACP driver 137 through the DC/DC converter 134 to three-phase AC power, and supplies the resultant three-phase AC power to the ACP 138. The ACP 138 is formed of a synchronous motor with a three-phase coil. The ACP 138 drives the motor in response to power supplied to the ACP 138, thereby supplying oxygen (air) to be used for power generation to the fuel cell 110.

The secondary battery 140 is a power storage that stores electric energy and can be charged and discharged repeatedly. For example, the secondary battery 140 can be formed of a lithium-ion cell. The secondary battery 140 may be a cell of a different type such as a rechargeable cell, a nickel-cadmium cell, or a nickel-hydrogen. The secondary battery 140 is connected to the DC/DC converter 134 in the PCU 130 through a low-voltage DC line DCL. The secondary battery 140 is further connected to the high-voltage DC line DCH through the DC/DC converter 134.

The SOC detector 142 detects the state of charge (SOC) [%] of the secondary battery 140 and transmits the detected SOC to the controller 180. The "state of charge (SOC)" mentioned in this specification means the ratio of a remaining charging level to a current charging capacity of the secondary battery 140. The SOC detector 142 detects a temperature Tba, an output voltage V, and an output current I of the secondary battery 140, and detects a state of charge (SOC) based on these values. The SOC detector 142 of this embodiment also transmits the temperature Tba of the secondary battery 140 to the controller 180.

The FC auxiliary machine 150 is connected to the low-voltage DC line DCL and driven with power supplied from the fuel cell 110 and the secondary battery 140. The FC auxiliary machine 150 is auxiliary machinery for power generation by the fuel cell 110 including a fuel pump through which the reactive gas is supplied to the fuel cell 110 and a refrigerant pump through which a refrigerant is supplied to the fuel cell 110. The accelerator position detector 190 detects the amount of depression of an accelerator (accelerator depressed amount $D_{ACC}$)[%] by a driver and transmits the detected amount to the controller 180.

The controller 180 is formed of a microcomputer including a central processing unit and a main storage. If the controller 180 detects operation by a driver such as operation on the accelerator, for example, the controller 180 controls power generation by the fuel cell 110 or charging and discharging of the secondary battery 140 in response to the substance of the operation. The controller 180 generates a driving signal responsive to the accelerator depressed amount $D_{ACC}$ and transmits the resultant driving signal to each of the motor driver 132 and the DC/DC converter 134. The motor driver 132 rotates the traction motor 136 in a manner responsive to the accelerator depressed amount $D_{ACC}$ by adjusting the pulse width of an AC voltage in response to the driving signal from the controller 180, for example. The controller 180 has a secondary battery-assisted control map prepared for power required to rotate the traction motor 136 in response to the accelerator depressed amount $D_{ACC}$. The secondary battery-assisted control map defines a relationship of a fraction of power with which the secondary battery 140 is to be burdened (secondary battery-assisted ratio) with the temperature and the state of charge (SOC) of the secondary battery 140. The controller 180 determines the secondary battery-assisted ratio using this map.

Figure 2:
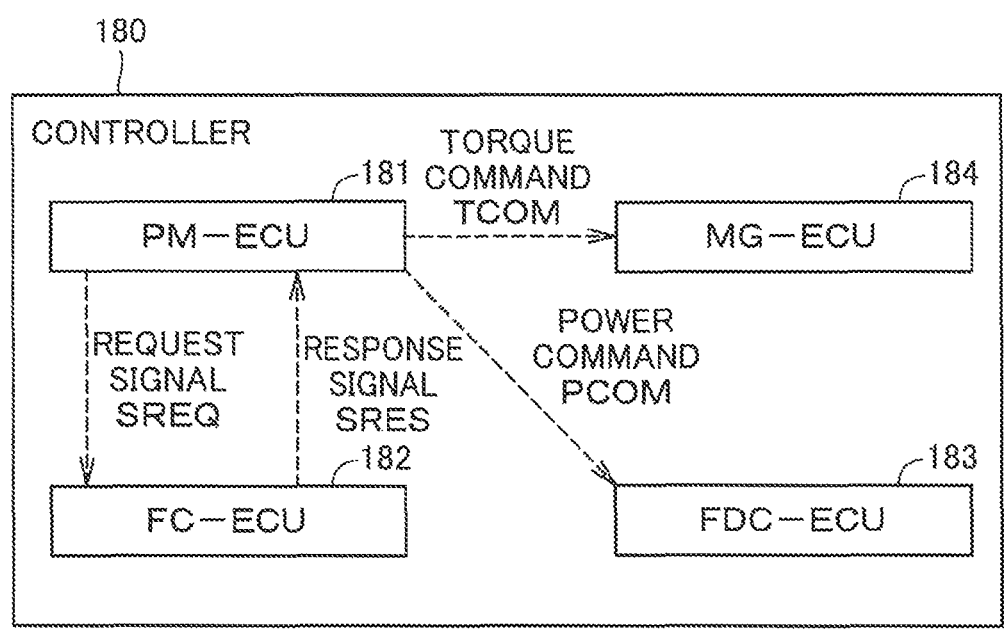
FIG. 2 is a view for explaining the configuration of a controller.

FIG. 2 is a view for explaining the configuration of the controller 180. The controller 180 includes four electronic control units (ECUs): a PM-ECU 181, an FC-ECU 182, an FDC-ECU 183, and an MG-ECU 184. The PM-ECU 181 acquires the accelerator depressed amount $D_{ACC}$ of the fuel cell vehicle 10 and issues various requests or commands required to drive the traction motor 136 at the number of revolutions responsive to the accelerator depressed amount $D_{ACC}$ to the other ECUs. The FC-ECU 182 controls the fuel cell 110 and the FC auxiliary machine 150. In response to receipt of a request signal SREQ described later from the PM-ECU 181, the FC-ECU 182 issues a response signal SRES responsive to the power generating capacity or characteristics of the fuel cell 110 to the PM-ECU 181. The FDC-ECU 183 controls the FC boost converter 120. In response to receipt of a power command PCOM described later from the PM-ECU 181, the FDC-ECU 183 makes the fuel cell 110 supply power responsive to the power command PCOM to the traction motor 136 and the ACP 138. The MG-ECU 184 controls the motor driver 132, the ACP driver 137, and the DC/DC converter 134. In response to receipt of a torque command TCOM described later from the PM-ECU 181, the MG-ECU 184 generates a torque responsive to the torque command TCOM at the traction motor 136 and the ACP 138. Exemplary operations of the four ECUs are described in detail below.

When a driver depresses an accelerator pedal, the PM-ECU 181 receives the accelerator depressed amount $D_{ACC}$ detected by the accelerator position detector 190. In response to receipt of the accelerator depressed amount $D_{ACC}$, the PM-ECU 181 calculates an required acceleration torque $T_{ACC}$ [N*m] indicating the magnitude of a torque responsive to the accelerator depressed amount $D_{ACC}$ and required for the traction motor 136. The required acceleration torque $T_{ACC}$ is calculated using an arithmetic expression showing a relationship between $D_{ACC}$ and $T_{ACC}$, for example. Further, the PM-ECU 181 calculates a required drivability torque $T_{MOD}$ [N*m] using the required acceleration torque $T_{ACC}$. If a change $^\Delta T_{ACC}$ [N*m/s] of the required acceleration torque $T_{ACC}$ is the same as or larger than a threshold (rate limiter) $^\Delta$Tth1, the required drivability torque $T_{MOD}$ is calculated so as to reduce the change $^\Delta T_{ACC}$ by performing rate processing (tuning) on the change $^\Delta T_{ACC}$. The required drivability torque $T_{MOD}$ is set to handle steep acceleration or deceleration of the fuel cell vehicle 10 and resultant reduction in comfortability to be caused by controlling acceleration or deceleration in response to the required acceleration torque $T_{ACC}$. The PM-ECU 181 issues the torque command TCOM including the calculated required drivability torque $T_{MOD}$ to the MG-ECU 184. In response to receipt of the torque command TCOM including the required drivability torque $T_{MOD}$, the MG-ECU 184 controls the traction motor 136 so as to generate an output torque responsive to the required drivability torque $T_{MOD}$. A torque actually generated at the traction motor 136 is also called an execution torque $T_{ACT}$. Power consumed by the traction motor 136 resulting from generation of the execution torque is also called T/M consumption power $P_{CONS}$.

The PM-ECU 181 calculates vehicle required power $P_{VHCL}$ [W] using the calculated required drivability torque $T_{MOD}$. The vehicle required power $P_{VHCL}$ is power required to place the fuel cell vehicle 10 in an operating state responsive to the required drivability torque $T_{MOD}$. The vehicle required power $P_{VHCL}$ corresponds to required generation power (command power $P_{COM}$) of the fuel cell 110. The vehicle required power $P_{VHCL}$ is calculated from the following formula (1):

$$P_{VHCL} = \max\{P_{T/M} + P_{AUX} + P_{chg}, P_{OC}\} \tag{1}$$

where $P_{T/M}$ is required driving power [W] of the traction motor 136, $P_{AUX}$ is required driving power [W] of the FC auxiliary machine 150 or the ACP 138, and $P_{chg}$ is power [W] to be charged to the secondary battery 140. Further, $P_{OC}$ is power [W] required to generate a high-potential evasion voltage during intermittent driving, for example. For example, $P_{T/M}$ can be calculated using motor characteristics showing a relationship of the number of revolutions and a required torque of the traction motor 136 with $P_{T/M}$. Further, $P_{AUX}$ can be calculated based on an actually measured value of power currently consumed by the FC auxiliary machine 150 or the ACP 138, for example. Alternatively, $P_{AUX}$ may be calculated by using consumption power of the FC auxiliary machine 150 as a constant and consumption power of the ACP 138 that is calculated using motor characteristics showing a relationship of the number of revolutions and a required torque of the motor of the ACP 138 with the consumption power. For example, $P_{chg}$ can be calculated using a map showing a relationship among a target SOC (60%, for example), a current SOC of the secondary battery 140, and $P_{chg}$. For calculation of the $P_{OC}$, the power-to-current characteristics (P-I characteristics) or the current-voltage characteristics (I-V characteristics) of the fuel cell 110 may be used. Alternatively, $P_{OC}$ may be a fixed value. The "vehicle required power $P_{VHCL}$" corresponds to "required generation power of a fuel cell" and "$P_{chg}$" corresponds to "charging power."

The PM-ECU 181 further calculates maximum required power $P_{MAX}$ [W] of the fuel cell 110 using the calculated required drivability torque $T_{MOD}$ and the state of the secondary battery 140. The maximum required power $P_{MAX}$ is a maximum value (guard value) of the required generation power of the fuel cell 110, specifically, a maximum value of the vehicle required power $P_{VHCL}$. The maximum required power $P_{MAX}$ is calculated from the following formula (2):

$$P_{MAX} = P_{T/M} + P_{AUX} + \alpha^* P_{win} \tag{2}$$

where $Pw_{in}$ is a maximum value of charging power [W] set in response to the temperature and the state of charge of the secondary battery 140. Further, $\alpha$ is a correction factor and $P_{win}$ can be calculated using the SOC charging and discharging characteristics and the temperature charging and discharging characteristics of the secondary battery 140. The SOC charging and discharging characteristics are shown in a map where the state of charge (SOC) of the secondary battery 140 is associated with an allowable input maximum value $W_{in}$ of input (charging) power $P_{in}$ and an allowable output maximum value $W_{out}$ of output (discharging) power $P_{out}$. The temperature charging and discharging characteristics are shown in a map where the temperature Tba of the secondary battery 140 is associated with the allowable input maximum value $W_{in}$ of the input power and the allowable output maximum value $W_{out}$ of the output power. The PM-ECU 181 can use either of the following allowable input maximum values $W_{in}$ as $P_{win}$ that is smaller than the other: the allowable input maximum value $W_{in}$ specified using the state of charge (SOC) acquired from the SOC detector 142 and the SOC charging and discharging characteristics, and the allowable input maximum value $W_{in}$ specified using the temperature Tba acquired from the SOC detector 142 and the temperature charging and discharging characteristics. The correction factor $\alpha$ is calculated through correction factor setting control described later. Below, the product of $\alpha$ and $P_{win}$ ($\alpha * P_{win}$) is also called "allowable charging power" of the secondary battery 140. The "PM-ECU 181" of this embodiment corresponds to a "required generation power calculator" and a "maximum required power calculator."

The PM-ECU 181 compares the vehicle required power $P_{VHCL}$ (command power $P_{COM}$) and the maximum required power $P_{MAX}$ calculated in the respective ways and determines whether the vehicle required power $P_{VHCL}$ does not exceed the maximum required power $P_{MAX}$. If the vehicle required power $P_{VHCL}$ does not exceed the maximum required power $P_{MAX}$, the PM-ECU 181 issues the request signal SREQ including the calculated vehicle required power $P_{VHCL}$ to the FC-ECU 182. If the vehicle required power $P_{VHCL}$ exceeds the maximum required power $P_{MAX}$, the PM-ECU 181 sets the value of the maximum required power $P_{MAX}$ as the vehicle required power $P_{VHCL}$. Then, the PM-ECU 181 issues the request signal SREQ including the vehicle required power $P_{VHCL}$ having the value of $P_{MAX}$ to the FC-ECU 182.

In response to receipt of the request signal SREQ including the vehicle required power $P_{VHCL}$, the FC-ECU 182 determines whether the vehicle required power $P_{VHCL}$ exceeds allowable power $P_{ALW}$ [W] of the fuel cell 110. The allowable power $P_{ALW}$ is a current maximum value of power that can be generated by the fuel cell 110 and can be calculated based on various parameters showing a current state of the fuel cell 110. The parameters showing a current state of the fuel cell 110 include the temperature of the fuel cell 110, the amount of external air taken in by the ACP 138, a remaining level of hydrogen in a hydrogen tank storing hydrogen to be supplied to the fuel cell 110, and an anode pressure and a cathode pressure of the fuel cell 110, for example. The FC-ECU 182 can calculate the allowable power $P_{ALW}$ using a map where these parameters and the allowable power $P_{ALW}$ are associated. If the vehicle required power $P_{VHCL}$ does not exceed the allowable power PAM, the FC-ECU 182 issues the response signal SRES including a current value I [A] and a voltage value V [V] responsive to the vehicle required power $P_{VHCL}$ to the PM-ECU 181. The current value I and the voltage value V responsive to the vehicle required power $P_{VHCL}$ can be calculated using the P-I characteristics and the I-V characteristics of the fuel cell 110. If the vehicle required power $P_{VHCL}$ exceeds the allowable power $P_{ALW}$, the FC-ECU 182 issues the response signal SRES including the current value I and the voltage value V responsive to the allowable power $P_{ALW}$ to the PM-ECU 181.

In response to receipt of the response signal SRES including the current value I and the voltage value V responsive to either the vehicle required power $P_{VHCL}$ or the allowable power $P_{ALW}$, the PM-ECU 181 issues the received current value I and the received voltage value V as the power command PCOM to the FDC-ECU 183. The power command PCOM may include the maximum required power $P_{MAX}$ in addition to the current value I and the voltage value V responsive to either the vehicle required power $P_{VHCL}$ or the allowable power $P_{ALW}$. Specifically, the power command PCOM may also be guarded in terms of its maximum. In response to receipt of the power command PCOM, the FDC-ECU 183 controls the FC boost converter 120 in a manner such that the fuel cell 110 outputs the current value I and the voltage value V responsive to the power command PCOM. Power the fuel cell 110 actually outputs is also called FC generated power $P_{FC}$. If the power command PCOM includes the maximum required power $P_{MAX}$, the FDC-ECU 183 may correct the current value I and the voltage value V, if appropriate, in a manner such that the current value I and the voltage value V do not exceed the maximum required power $P_{MAX}$. Then, the FDC-ECU 183 may control the FC boost converter 120 in a manner such that the fuel cell 110 outputs the corrected current value I and the corrected voltage value V.

On the other hand, the PM-ECU 181 calculates ACP required driving power $P_{RQ}$ [W] using the required acceleration torque $T_{ACC}$. The ACP required driving power $P_{RQ}$ is power required to place the ACP 138 in a driving state responsive to the required acceleration torque $T_{ACC}$. For example, the ACP required driving power $P_{RQ}$ can be calculated using an arithmetic expression showing a relationship between $T_{ACC}$ and $P_{RQ}$. The PM-ECU 181 issues the request signal SREQ including the calculated ACP required driving power $P_{RQ}$ to the FC-ECU 182.

In response to receipt of the request signal SREQ including the ACP required driving power $P_{RQ}$, the FC-ECU 182 calculates the number of revolutions (required number of revolutions) $R_{RQ}$ [rpm] of the ACP 138 responsive to the ACP required driving power $P_{RQ}$. The required number of revolutions $R_{RQ}$ can be calculated by the following method, for example. First, the current value I of the fuel cell 110 to be used to generate the ACP required driving power $P_{RQ}$ is calculated using the value of the ACP required driving power $P_{RQ}$, and the P-I characteristics and the I-V characteristics of the fuel cell 110. Then, the amount of oxygen to be used to generate the ACP required driving power $P_{RQ}$ is calculated using a charge amount responsive to the calculated current value I and a formula of electrochemical reaction occurring during power generation. Then, using the calculated amount of oxygen and a content ratio of air, the amount of air to be used to generate the ACP required driving power $P_{RQ}$ is calculated. The required number of revolutions $R_{RQ}$ of the ACP 138 is calculated using the calculated amount of air. The FC-ECU 182 issues the response signal SRES including the required number of revolutions $R_{RQ}$ thereby calculated to the PM-ECU 181.

In response to receipt of the response signal SRES including the required number of revolutions $R_{RQ}$, the PM-ECU 181 calculates an ACP required torque $T_{ACP}$ [N*m] using the required number of revolutions $R_{RQ}$. The PM-ECU 181 issues the torque command TCOM including the calculated ACP required torque $T_{ACP}$ to the MG-ECU 184. In response to receipt of the torque command TCOM including the ACP required torque $T_{ACP}$, the MG-ECU 184 controls the ACP 138 so as to generate an output torque responsive to the ACP required torque $T_{ACP}$.

As described above, the PM-ECU 181 of this embodiment is configured to calculate the vehicle required power $P_{VHCL}$ (command power $P_{COM}$) using the required drivability torque $T_{MOD}$ and calculate the ACP required driving power $P_{RQ}$ using the required acceleration torque $T_{ACC}$. According to this configuration, if the calculated vehicle required power $P_{VHCL}$, specifically, if the required generation power of the fuel cell 110 is reduced rapidly, the ACP required driving power $P_{RQ}$ can be reduced at a rate higher than a rate of reduction of the required generation power (vehicle required power $P_{VHCL}$). This can make it unlikely that drying-up of the fuel cell 110 or deterioration of fuel economy due to excessive power generation will occur during rapid reduction of the vehicle required power $P_{VHCL}$. More specifically, if response is delayed by inertia and the vehicle required power $P_{VHCL}$ is reduced rapidly, the ACP 138 continues to supply oxygen to the fuel cell 110 until the ACP 138 stops even after the ACP required driving power $P_{RQ}$ becomes zero. This excessive supply of oxygen causes drying-up of the fuel cell 110 or excessive power generation. In this regard, by reducing the ACP required driving power $P_{RQ}$ at a rate higher than a rate of reduction of the vehicle required power $P_{VHCL}$, the amount of oxygen supplied by the ACP 138 in a delayed manner relative to the ACP required driving power $P_{RQ}$ can approximate the amount of air required for the vehicle required power $P_{VHCL}$ at the time of the supply. This suppresses supply of unnecessary oxygen after the vehicle required power $P_{VHCL}$ becomes zero, so that the occurrence of drying-up of the fuel cell 110 or the occurrence of excessive power generation can be suppressed.

The PM-ECU 181 of this embodiment is also configured to regulate the maximum of the vehicle required power $P_{VHCL}$ (command power $P_{COM}$) using the maximum required power $P_{MAX}$. This configuration can reduce the vehicle required power $P_{VHCL}$ in a manner that depends on reduction of the allowable input maximum value $W_{in}$ caused by the temperature or the state of charge (SOC) of the secondary battery 140. This suppresses the FC generated power $P_{FC}$, thereby reducing the occurrence of overcharge of the secondary battery 140. More specifically, as seen from a comparison between the maximum required power $P_{MAX}$ and the vehicle required power $P_{VHCL}$, the maximum required power $P_{MAX}$ is determined by replacing the charging power $P_{chg}$ to the secondary battery 140 by the allowable charging power $\alpha * P_{win}$. The allowable charging power $\alpha * P_{win}$ is the product of the allowable input maximum value $W_{in}$ determined using the temperature and the state of charge (SOC) of the secondary battery 140 and the correction factor. Thus, reduction in the allowable input maximum value $W_{in}$ causes reduction in the allowable charging power $\alpha * P_{win}$ accordingly. As a result, if the allowable input maximum value $W_{in}$ is reduced because the state of charge (SOC) of the secondary battery 140 is high or the temperature of the secondary battery 140 is high, for example, the vehicle required power $P_{VHCL}$ can be reduced by using the maximum required power $P_{MAX}$. The PM-ECU 181 of this embodiment calculates the correction factor $\alpha$ in the maximum required power $P_{MAX}$ through the following control (correction factor setting control).

Figure 3:
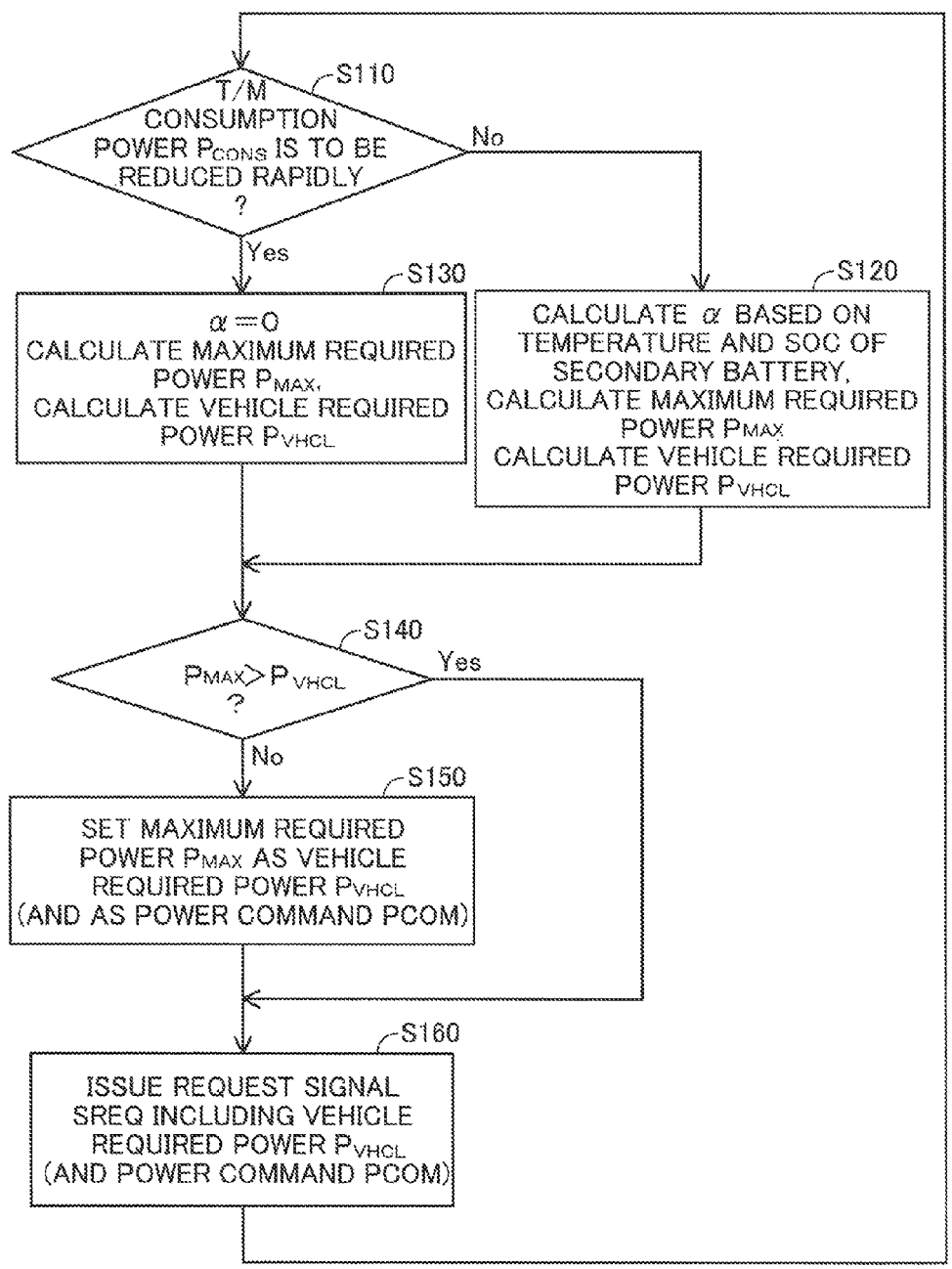
FIG. 3 is a flowchart for explaining correction factor setting control.

FIG. 3 is a flowchart for explaining the correction factor setting control. First, the PM-ECU 181 determines whether the T/M consumption power $P_{CONS}$ showing power consumed by the traction motor 136 is to be reduced rapidly (step S110). Whether the T/M consumption power $P_{CONS}$ is to be reduced rapidly is determined by determining whether a predetermined condition as a condition for rapid reduction in the T/M consumption power $P_{CONS}$ is satisfied. The predetermined condition mentioned herein is satisfied if a reduction rate of the accelerator depressed amount $D_{ACC}$, specifically, if a diminution $|\Delta D_{ACC}|$ per unit time ($0 > {}^{\Delta}D_{ACC}$ [%/s]) is the same as or larger than a threshold ${}^{\Delta}$Dth ($|\Delta D_{ACC}| \geq \Delta$Dth), or if a predetermined period of time has not elapsed after $|\Delta D_{ACC}|$ becomes the same as or larger than the threshold ${}^{\Delta}$Dth. The T/M consumption power $P_{CONS}$ continues to be reduced rapidly within a given period of time after the accelerator becomes off completely. Thus, in this embodiment, the "condition for rapid reduction in the T/M consumption power $P_{CONS}$" includes "no elapse of the predetermined period of time after $|\Delta D_{ACC}|$ becomes the same as or larger than the threshold ${}^{\Delta}$Dth." The "predetermined condition" mentioned herein can be any condition under which the T/M consumption power $P_{CONS}$ is considered to be reduced rapidly. For example, a condition set as this predetermined condition may be satisfied if a diminution $|\Delta D_{MOD}|$ per unit time of the required drivability torque $T_{MOD}$ becomes the same as or larger than a threshold ${}^{\Delta}$Tth1. Alternatively, a condition set as this predetermined condition may be satisfied if a diminution $|{}^{\Delta}T_{ACC}|$ per unit time of the required acceleration torque $T_{ACC}$ becomes the same as or larger than a threshold ${}^{\Delta}$Tth2 or if a predetermined period of time has not elapsed after $|\Delta T_{ACC}|$ becomes the same as or larger than the threshold ${}^{\Delta}$Dth2. The "threshold ${}^{\Delta}$Dth" of this embodiment corresponds to a "first threshold."

If the T/M consumption power $P_{CONS}$ is not to be reduced rapidly because the diminution $|\Delta D_{ACC}|$ per unit time of the accelerator depressed amount $D_{ACC}$ is smaller than the threshold ${}^{\Delta}$Dth ($|\Delta D_{ACC}| < \Delta$Dth) (step S110: No), the PM-ECU 181 calculates the correction factor α based on the temperature Tba and the state of charge (SOC) of the secondary battery 140. Further, the PM-ECU 181 calculates the maximum required power $P_{MAX}$ and the vehicle required power $P_{VHCL}$ (step S120).

Figure 4:
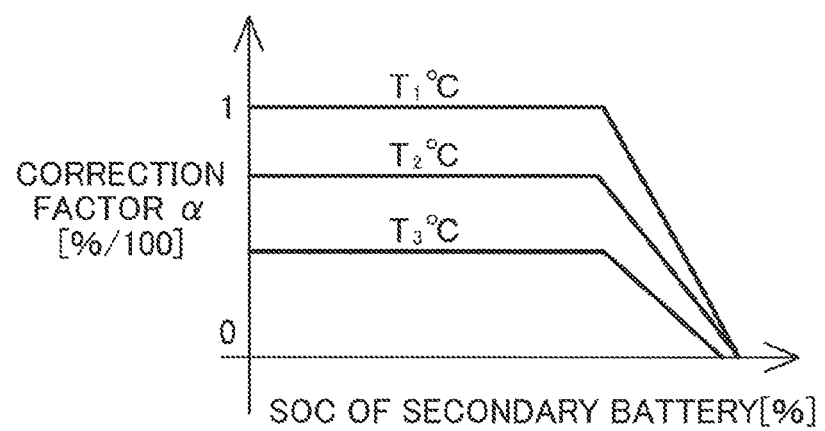
FIG. 4 is an explanatory view showing a relationship of a correction factor α with the temperature and the state of charge of a secondary battery.

FIG. 4 is an explanatory view illustrating a relationship of the correction factor α with the temperature Tba and the state of charge (SOC) of the secondary battery 140. FIG. 4 shows a relationship between the state of charge (SOC) and the correction factor α determined under each of different temperatures (such as $T_1$, $T_2$, and $T_3$) [° C.] of the secondary battery 140. The map of FIG. 4 can be formed by calculation using the SOC charging and discharging characteristics and the temperature charging and discharging characteristics of the secondary battery 140. Referring back to FIG. 3, the PM-ECU 181 calculates the correction factor α using the map of FIG. 4. Then, the PM-ECU 181 calculates the maximum required power $P_{MAX}$ using the calculated correction factor α and the aforementioned formula (2). Further, the PM-ECU 181 calculates the vehicle required power $P_{VHCL}$ (command power $P_{COM}$) using the aforementioned formula (1).

If the T/M consumption power $P_{CONS}$ is to be reduced rapidly because the diminution $|\Delta D_{ACC}|$ per unit time of the accelerator depressed amount $D_{ACC}$ is the same as or larger than the threshold ${}^{\Delta}$Dth ($|\Delta D_{ACC}| \geq \Delta$Dth) (step S110: Yes), the PM-ECU 181 sets the correction factor α to zero. With the correction factor α set to zero, the PM-ECU 181 calculates the maximum required power $P_{MAX}$ using the formula (2). Further, the PM-ECU 181 calculates the vehicle required power $P_{VHCL}$ (command power $P_{COM}$) using the formula (1) (step S130).

After calculating the maximum required power $P_{MAX}$ and the vehicle required power $P_{VHCL}$, the PM-ECU 181 determines whether the vehicle required power $P_{VHCL}$ does not exceed the maximum required power $P_{MAX}$ (step S140). If the vehicle required power $P_{VHCL}$ does not exceed the maximum required power $P_{MAX}$, the PM-ECU 181 issues the request signal SREQ including the calculated vehicle required power $P_{VHCL}$ to the FC-ECU 182 (step S160). At this time, the PM-ECU 181 may issue the power command $P_{COM}$ including the maximum required power $P_{MAX}$ and the vehicle required power $P_{VHCL}$ to the FDC-ECU 183.

On the other hand, if the vehicle required power $P_{VHCL}$ exceeds the maximum required power $P_{MAX}$, the PM-ECU 181 sets the value of the maximum required power $P_{MAX}$ as the vehicle required power $P_{VHCL}$ (step S150). At this time, the PM-ECU 181 may set the value of the maximum required power $P_{MAX}$ to the power command $P_{COM}$. Then, the PM-ECU 181 issues the request signal SREQ including the vehicle required power $P_{VHCL}$ having the value of $P_{MAX}$ to the FC-ECU 182 (step S160). At this time, the PM-ECU 181 may issue the power command $P_{COM}$ including the vehicle required power $P_{VHCL}$ having the value of $P_{MAX}$ to the FDC-ECU 183.

Figure 5:
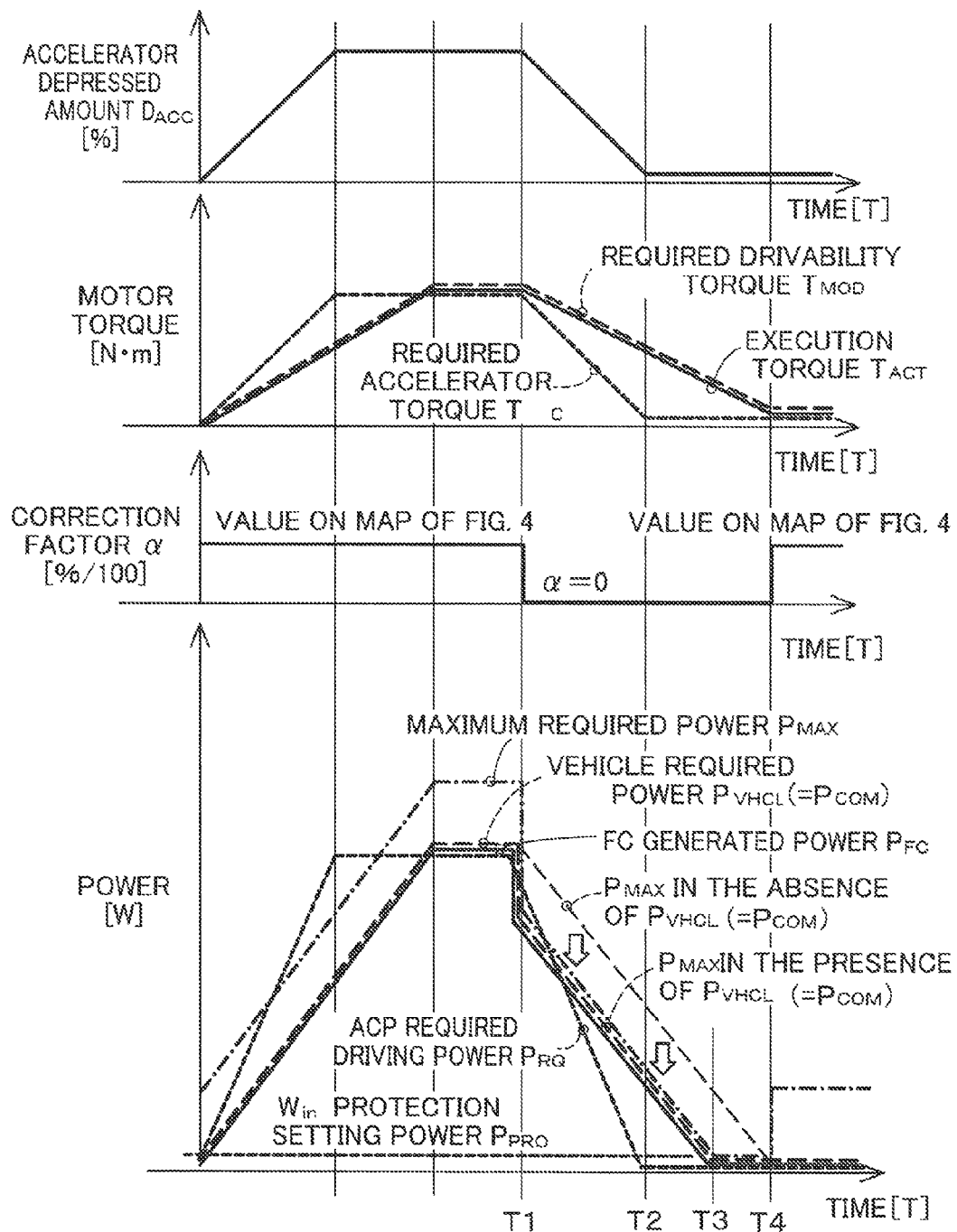
FIG. 5 is a timing chart illustrating the state of the fuel cell vehicle of the first embodiment.

FIG. 5 is a timing chart illustrating the state of the fuel cell vehicle 10 of this embodiment. FIG. 5 illustrates a time-series change of each of the accelerator depressed amount $D_{ACC}$, required acceleration torque $T_{ACC}$, the required drivability torque $T_{MOD}$, the execution torque $T_{ACT}$, the correction factor α, the maximum required power $P_{MAX}$, the vehicle required power $P_{VHCL}$ (command power $P_{COM}$), the FC generated power $P_{FC}$, and the ACP required driving power $P_{RQ}$. FIG. 5 further illustrates a section of the vehicle required power $P_{VHCL}$ determined in the absence of the maximum required power $P_{MAX}$. This example is based on the assumption that a driver starts turning off the accelerator at a time point T1 and the accelerator becomes off completely at a time point T2. This example is further based on the assumption that in a period from T1 to T2, the diminution $|\Delta D_{ACC}|$ of the accelerator depressed amount $D_{ACC}$ becomes the same as or larger than the threshold ${}^{\Delta}$Dth ($|\Delta D_{ACC}| \geq \Delta$Dth) and that a period from T2 to T4 is within the predetermined period of time after $|\Delta D_{ACC}|$ becomes the same as or larger than the threshold ${}^{\Delta}$Dth (after the time point T2).

The required acceleration torque $T_{ACC}$ is responsive to the accelerator depressed amount $D_{ACC}$. Thus, the required acceleration torque $T_{ACC}$ starts to be reduced at the time point T1 and becomes zero at the time point T2. The required drivability torque $T_{MOD}$ is subjected to rate processing relative to the required acceleration torque $T_{ACC}$, so that it is reduced more gently than the required acceleration torque $T_{ACC}$. Likewise, the execution torque $T_{ACT}$, which is responsive to the required drivability torque $T_{MOD}$, is reduced gently in a period from T1 to T4. The correction factor α becomes zero in the period from T1 to T4 for reason that the period from T1 to T4 corresponds to a period when the T/M consumption power $P_{CONS}$ is reduced rapidly.

The value of the maximum required power $P_{MAX}$ is reduced largely at the time point T1 because the correction factor α becomes zero at the time point T1 to make $α*P_{win}$ included in the maximum required power $P_{MAX}$ zero. The value of the maximum required power $P_{MAX}$ is reduced in a period from T1 to T3 for the reason that in this period, the required drivability torque $T_{MOD}$ is reduced to reduce $P_{T/M}$+ $P_{AUX}$ included in the maximum required power $P_{MAX}$. At the time point T3, the maximum required power $P_{MAX}$ becomes $W_{in}$ protection setting power $P_{PRO}$ having a value functioning as a minimum value (guard value). The Win protection setting power $P_{PRO}$ is predetermined as the value of minimum required power that should be supplied to the secondary battery 140 for protection of the secondary battery 140.

The value of the maximum required power $P_{MAX}$ is increased largely at the time point T4 for the reason that T4 is a time point when the correction factor α takes on a value other than zero to make $\alpha*P_{win}$ included in the maximum required power $P_{MAX}$ take on a value other than zero.

The vehicle required power $P_{VHCL}$ (command power $P_{COM}$) is responsive to the required drivability torque $T_{MOD}$, whereas the maximum required power $P_{MAX}$ is the maximum value (guard value) of the vehicle required power $P_{VHCL}$. The value of the vehicle required power $P_{VHCL}$ is reduced largely at the time point T1 for the reason that the maximum required power $P_{MAX}$ is reduced rapidly at the time point T1. The value of the vehicle required power $P_{VHCL}$ is restricted by the maximum required power $P_{MAX}$ in the period from T1 to T4. The FC generated power $P_{FC}$ is responsive to the vehicle required power $P_{VHCL}$. Thus, if the vehicle required power $P_{VHCL}$ is restricted by the maximum required power $P_{MAX}$, the FC generated power $P_{FC}$ is restricted accordingly. The ACP required driving power $P_{RQ}$ is responsive to the required acceleration torque $T_{ACC}$, so that it is reduced in the period from T1 to T2.

Figure 6:
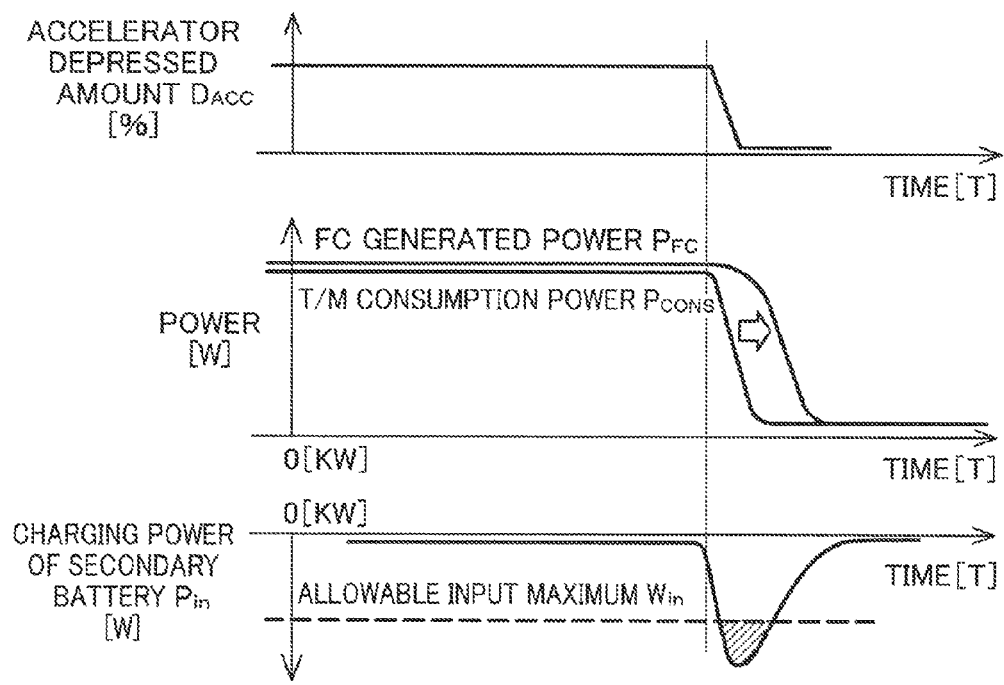
FIG. 6 is a timing chart illustrating the state of a fuel cell vehicle of Comparative Example 1.

FIG. 6 is a timing chart illustrating the state of a fuel cell vehicle of Comparative Example 1. FIG. 6 illustrates a time-series change of each of the accelerator depressed amount $D_{ACC}$, the FC generated power $P_{FC}$, the T/M consumption power $P_{CONS}$, the input (charging) power $P_{in}$ of the secondary battery 140, and the allowable input maximum value $W_{in}$. The fuel cell vehicle of Comparative Example 1 is the same as the fuel cell vehicle 10 of this embodiment, except that the maximum required power $P_{MAX}$ is not calculated. In this case, if the T/M consumption power $P_{CONS}$ is reduced by turning off of the accelerator, for example, $P_{T/M}+P_{AUX}$ included in the vehicle required power $P_{VHCL}$ is reduced to reduce the FC generated power $P_{FC}$ accordingly. However, when the T/M consumption power $P_{CONS}$ is reduced rapidly, the FC generated power $P_{FC}$ temporarily delays in responding to this rapid reduction in the T/M consumption power $P_{CONS}$. An excess of power generated during the delay is supplied to the secondary battery, possibly causing overcharge of the secondary battery. It is also likely that the input (charging) power $P_{in}$ to be supplied to the secondary battery 140 will exceed the allowable input maximum value $W_{in}$. In contrast, in this embodiment, if the T/M consumption power $P_{CONS}$ is to be reduced rapidly, $P_{T/M}+P_{AUX}$ included in the vehicle required power $P_{VHCL}$ is reduced and the allowable charging power $\alpha*P_{win}$ becomes zero. Thus, the FC generated power $P_{FC}$ can be reduced readily. This suppresses generation of excessive power, thereby making overcharge of the secondary battery 140 unlikely. This can also make it unlikely that the charging power $P_{in}$ supplied to the secondary battery 140 will exceed the allowable input maximum value $W_{in}$.

Figure 7:
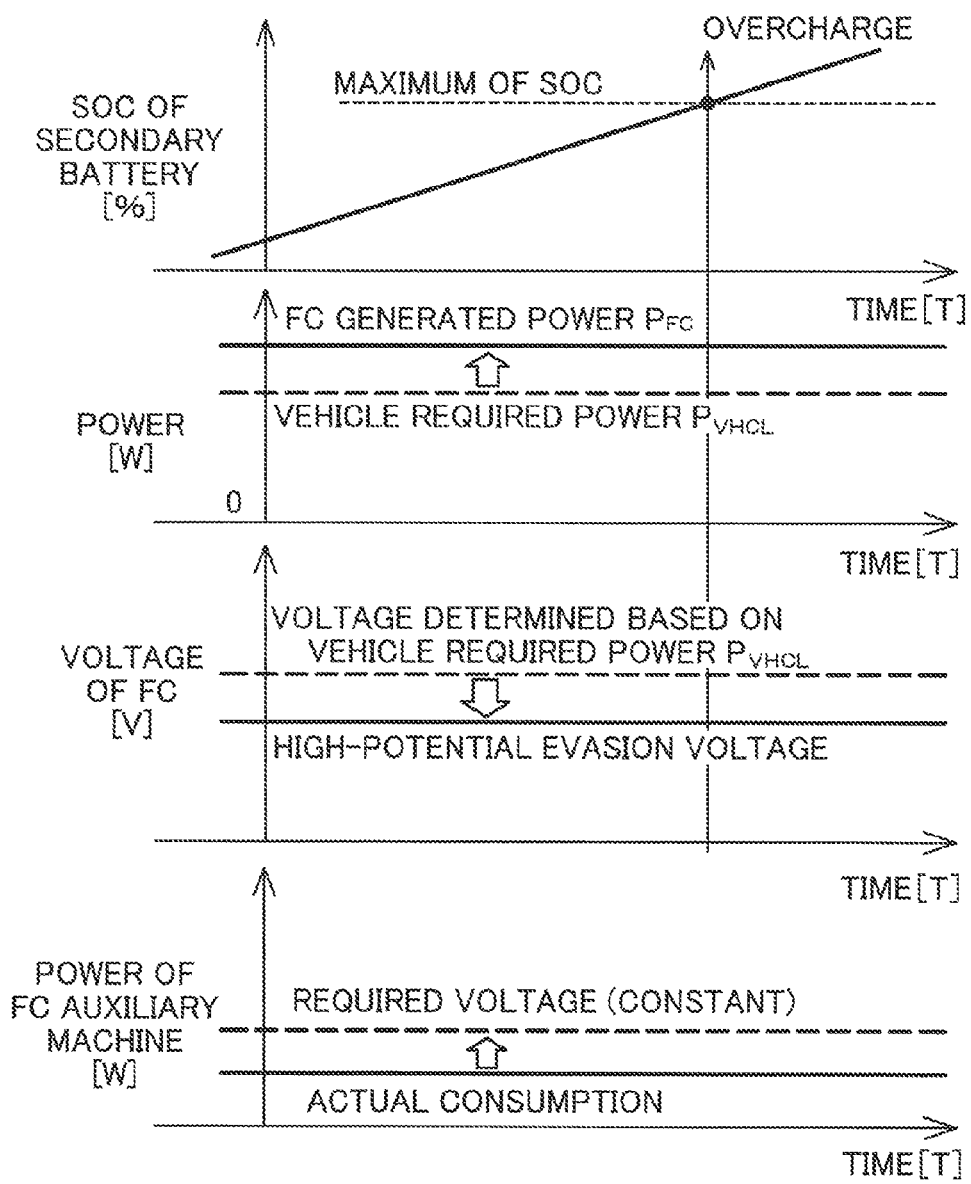
FIG. 7 is a timing chart illustrating the state of a fuel cell vehicle of Comparative Example 2.

FIG. 7 is a timing chart illustrating the state of a fuel cell vehicle of Comparative Example 2. FIG. 7 illustrates a time-series change of each of the state of charge (SOC) of a secondary battery, the FC generated power $P_{FC}$, the vehicle required power $P_{VHCL}$, a voltage of power generated by a fuel cell, and consumption power of an FC auxiliary machine. The fuel cell vehicle of Comparative Example 2 is the same as the fuel cell vehicle 10 of this embodiment, except that the maximum required power $P_{MAX}$ is not calculated and the vehicle required power $P_{VHCL}$ is calculated as $P_{T/M}+P_{AUX}P_{chg}$. If the vehicle required power $P_{VHCL}$ is calculated as $P_{T/M}+P_{AUX}P_{chg}$, power generated for generating the high-potential evasion voltage may exceed the vehicle required power $P_{VHCL}$ during intermittent driving. This makes the FC generated power $P_{FC}$ exceed the vehicle required power $P_{VHCL}$. As a result of the FC generated power $P_{FC}$ exceeding the vehicle required power $P_{VHCL}$, an excess of the generated power is supplied to the secondary battery, possibly causing overcharge of the secondary battery. In contrast, the vehicle required power $P_{VHCL}$ of this embodiment is configured to take on either of the following values that is larger than the other: a value calculated as $P_{T/M}P_{AUX}P_{chg}$ and the value of $P_{OC}$. This can make it unlikely that the FC generated power $P_{FC}$ will exceed the vehicle required power $P_{VHCL}$.

In Comparative Example 2, if required power of the FC auxiliary machine is set as a constant, power actually consumed by the FC auxiliary machine may become smaller than the required power. In this case, an excess of generated power may be supplied to the secondary battery, possibly causing overcharge of the secondary battery. In contrast, in this embodiment, even if required power of the FC auxiliary machine is set as a constant, the allowable charging power $\alpha*P_{win}$ included in the maximum required power $P_{MAX}$ is reduced in response to increase in the state of charge (SOC) of the secondary battery. This suppresses the FC generated power $P_{FC}$ to make the occurrence of overcharge of the secondary battery unlikely.

In the fuel cell vehicle 10 of the aforementioned embodiment, if the T/M consumption power $P_{CONS}$ is to be reduced rapidly, the allowable charging power $\alpha*P_{win}$ of the secondary battery 140 becomes zero to reduce the maximum required power $P_{MAX}$. Thus, the FC generated power $P_{FC}$ can be reduced readily. This can reduce overcharge of the secondary battery 140 that is to occur during rapid reduction of the T/M consumption power $P_{CONS}$. Further, the maximum required power $P_{MAX}$ of this embodiment includes the allowable charging power $\alpha*P_{win}$ that is the product of the allowable input maximum value $W_{in}$ determined using the temperature and the state of charge (SOC) of the secondary battery 140 and the correction factor. Thus, if the allowable input maximum value $W_{in}$ is reduced by the temperature or the state of charge (SOC) of the secondary battery 140, the vehicle required power $P_{VHCL}$ can be reduced accordingly. This suppresses the FC generated power $P_{FC}$, so that the occurrence of overcharge of the secondary battery 140 can be reduced.

B. Second Embodiment

Figure 8:
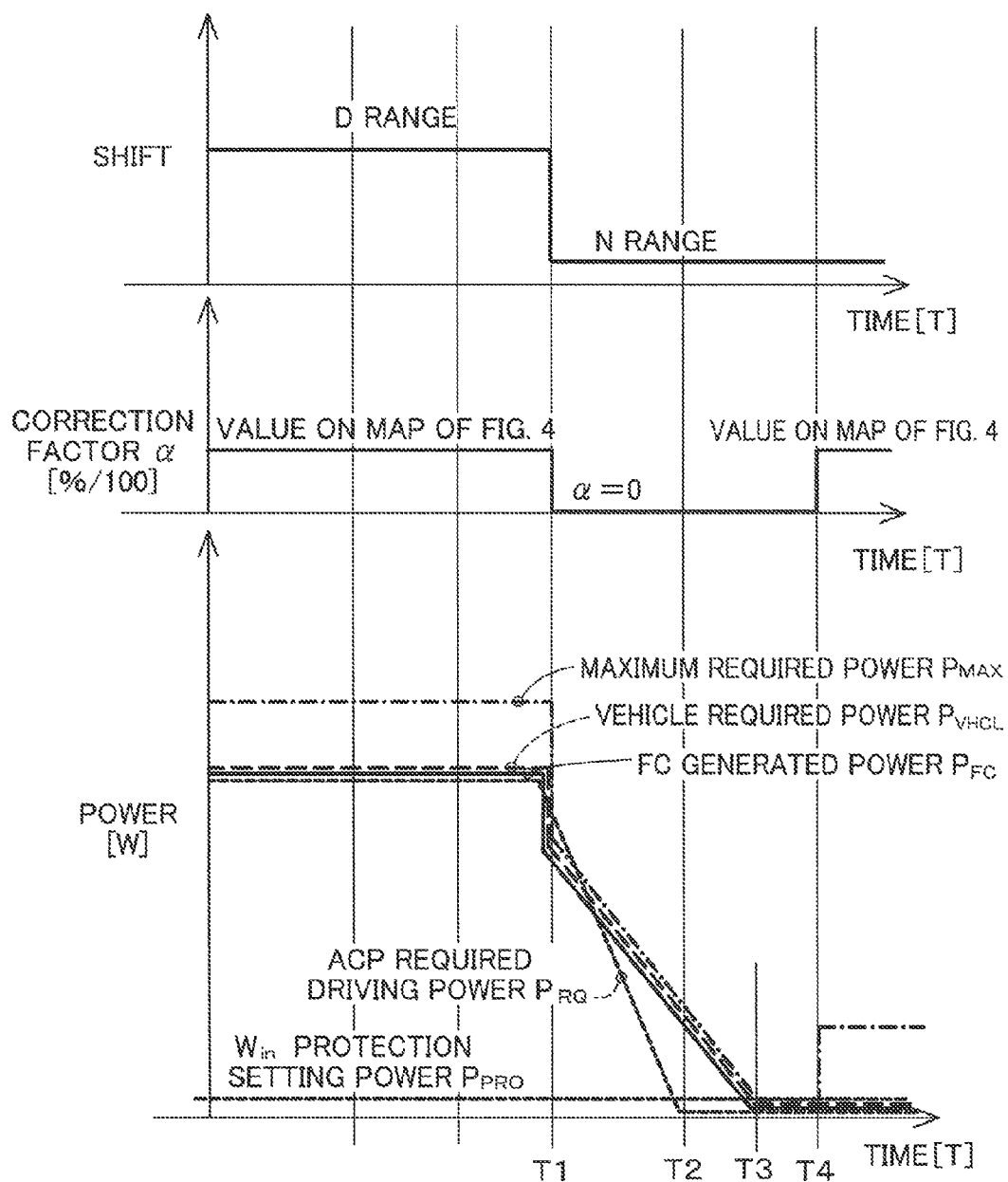
FIG. 8 is a timing chart illustrating the state of a fuel cell vehicle of a second embodiment.

FIG. 8 is a timing chart illustrating the state of a fuel cell vehicle 10A of a second embodiment. FIG. 8 shows a time-series change of each of a shift position of the fuel cell vehicle 10A, the correction factor α, the maximum required power $P_{MAX}$, the vehicle required power $P_{VHCL}$, the FC generated power $P_{FC}$, and the ACP required driving power $P_{RQ}$. The fuel cell vehicle 10A of the second embodiment is the same as the fuel cell vehicle 10 of the first embodiment, except that the detail of the "predetermined condition" used in step S110 of the correction factor setting control (FIG. 3) is different. The "predetermined condition" set for the fuel cell vehicle 10A of the second embodiment is satisfied if the shift position is changed from D (drive) to N (neutral) and the FC generated power $P_{FC}$ becomes the same as or larger than the Win protection setting power $P_{PRO}$, or if a predetermined period of time has not elapsed after these states are produced. Like in the first embodiment, the Win protection setting power $P_{PRO}$ is the value of minimum required power that should be supplied to the secondary battery 140 for protection of the secondary battery 140. The "Win protection setting power $P_{PRO}$" of this embodiment corresponds to a "second threshold."

If the shift position of the fuel cell vehicle 10A is changed from D (drive) to N (neutral), the T/M consumption power $P_{IONS}$ is reduced rapidly. Even in this case, the allowable charging power $\alpha*P_{win}$ of the secondary battery 140 still becomes zero to reduce the maximum required power $P_{MAX}$. Thus, the FC generated power $P_{FC}$ can be reduced readily. This can reduce overcharge of the secondary battery 140 that is to occur during rapid reduction of the T/M consumption power $P_{CONS}$.

C. Third Embodiment

Figure 9:
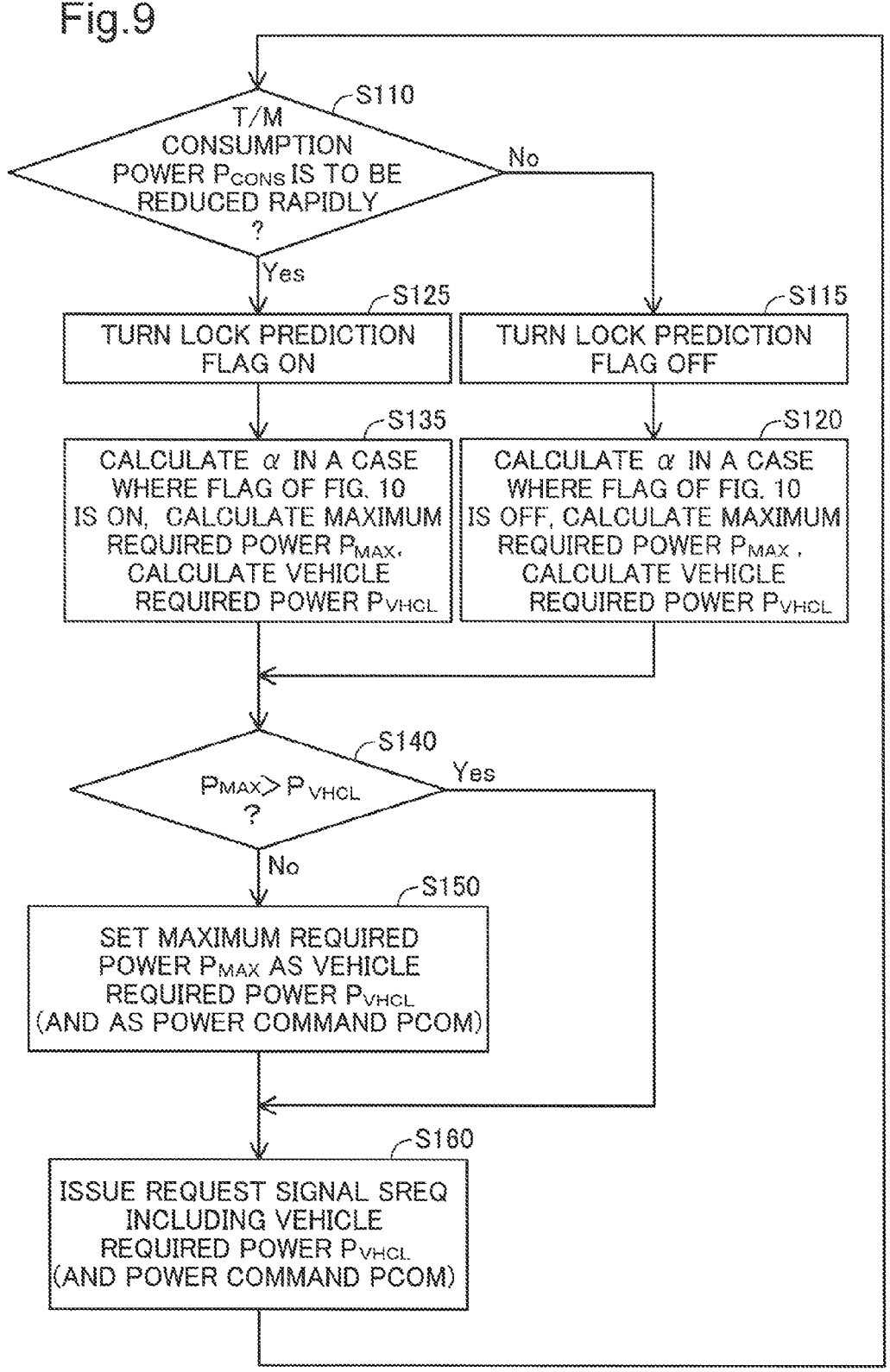
FIG. 9 is a flowchart illustrating correction factor setting control of a third embodiment.

FIG. 9 is a flowchart for explaining a correction factor setting control of a third embodiment. In comparison to the correction factor setting control of the first embodiment (FIG. 3), the correction factor setting control of the third embodiment includes steps S110, S115, S125, and S135 differing from those of the correction factor setting control of the first embodiment. The correction factor setting control of the third embodiment is the same in other respects (steps S120, S140, S150, and S160) as the correction factor setting control of the first embodiment. The "predetermined condition" in step S110 of the third embodiment is satisfied if braking force Fb of a fuel cell vehicle 10B generated by application of a brake becomes larger than driving force Fd of tires of the fuel cell vehicle 10B generated by the traction motor 136 (Fb>Fd). The braking force Fb of the fuel cell vehicle 10B can be calculated using the amount of depression of a brake (brake depressed amount $D_{BR}$)[%] by a driver. The brake depressed amount $D_{BR}$ can be detected for example by providing a brake position detector in the fuel cell vehicle 10B. The brake position detector may transmit the detected brake depressed amount $D_{BR}$ to the controller 180. The driving force Fd of the fuel cell vehicle 10B can be calculated using the accelerator depressed amount $D_{ACC}$ and the number of revolutions of the traction motor 136, for example. The braking force Fb may become larger than the driving force Fd (Fb>Fd) if the driver depresses the brake during acceleration of the fuel cell vehicle 10B, for example. In this case, in the fuel cell vehicle 10B, the number of revolutions of the traction motor 136 is reduced rapidly while the fuel cell 110 generates power to reduce consumption power of the traction motor 136 (T/M consumption power $P_{CONS}$) rapidly.

If determining that the braking force Fb is larger than the driving force Fd (Fb>Fd), the PM-ECU 181 turns a lock prediction flag on (step S125). If determining that the braking force Fb is the same as or smaller than the driving force Fd (Fb≤Fd), the PM-ECU 181 turns the lock prediction flag off (step S115). The lock prediction flag shows whether the traction motor 136 is likely to be locked. The braking force Fb being larger than the driving force Fd is considered to make it likely that the traction motor 136 will be locked. Thus, in this case, the prediction flag is erected. In step S135, the PM-ECU 181 calculates the correction factor α based on the lock prediction flag and the temperature Tba and the state of charge (SOC) of the secondary battery 140. Further, the PM-ECU 181 calculates the maximum required power $P_{MAX}$ and the vehicle required power $P_{VHCL}$.

Figure 10:
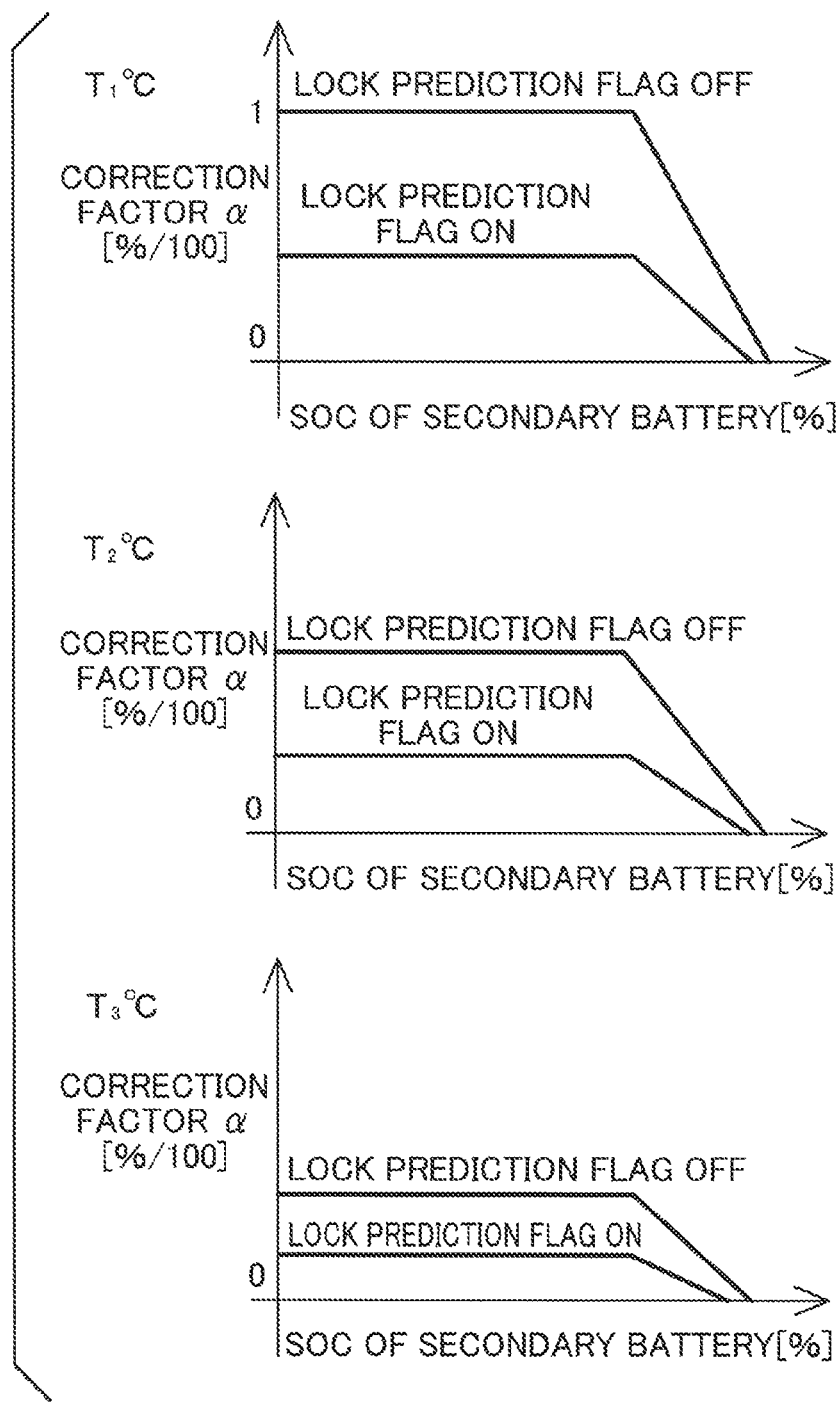
FIG. 10 is an explanatory view illustrating a correction factor α of the third embodiment.

FIG. 10 is an explanatory view illustrating a relationship of the correction factor α of the third embodiment with the temperature Tba and the state of charge (SOC) of the secondary battery 140. FIG. 10 shows a relationship between the state of charge (SOC) and the correction factor α determined under each of different temperatures (such as $T_1$, $T_2$, and $T_3$) [° C.] of the secondary battery 140. This relationship is shown in each of a case where the lock prediction flag is on and a case where the lock prediction flag is off. As shown in FIG. 10, under the same temperature and with the same state of charge of the secondary battery 140, the value of the correction factor α of the case where the lock prediction flag is on is determined to be smaller than that of the case where the lock prediction flag is off. Specifically, the correction factor α is configured so as to be reduced relatively if the lock prediction flag is on. Under the same temperature and with the same state of charge of the secondary battery 140, the value of the correction factor α of the case where the lock prediction flag is off is determined to be larger than that of the case where the lock prediction flag is on. Specifically, the correction factor α is configured so as to be increased relatively if the lock prediction flag is off. It is preferable that the correction factor α of the case where the lock prediction flag is off take on a value that is the same as that of the correction factor α of the first embodiment shown in FIG. 4.

Figure 11:
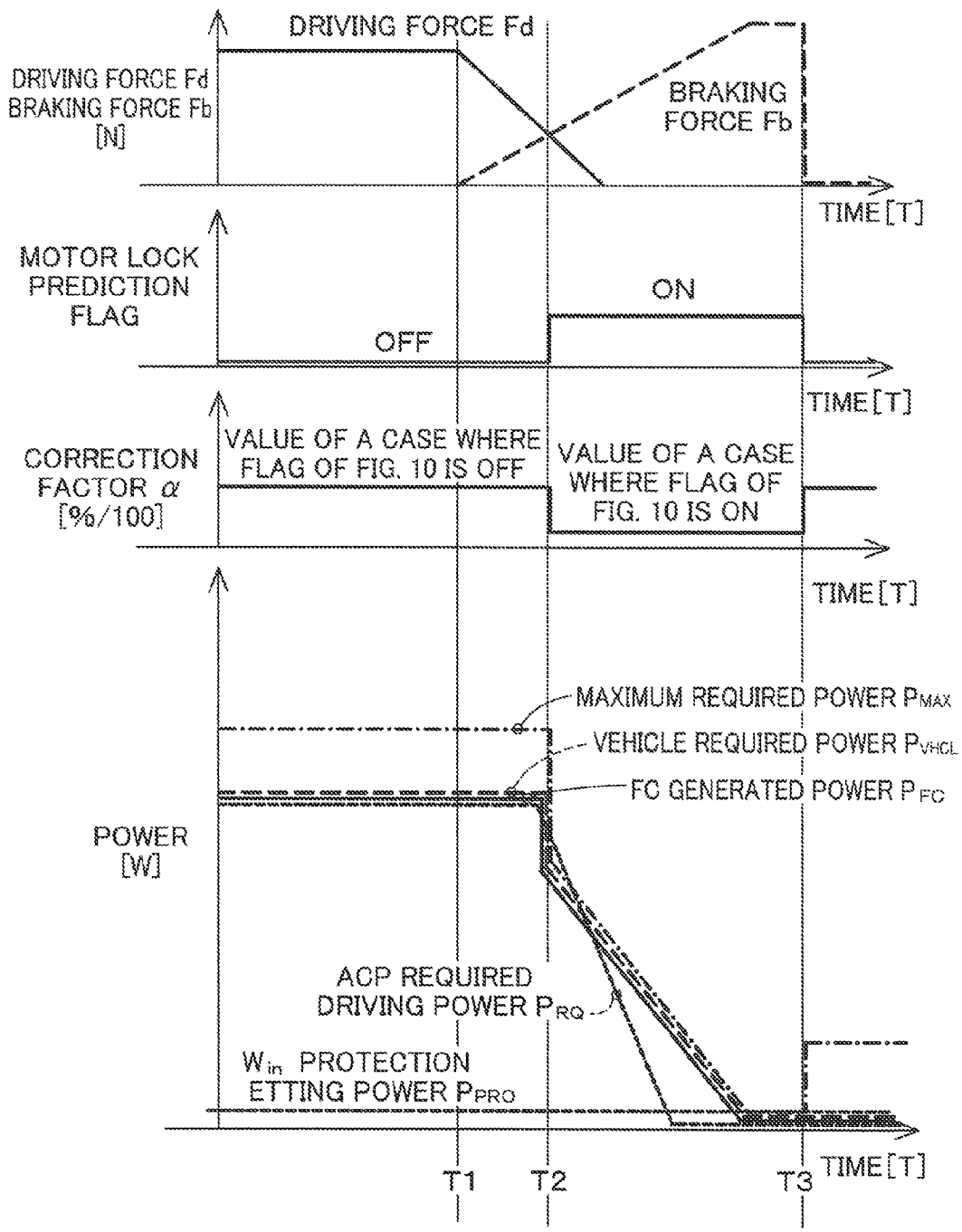
FIG. 11 is a timing chart showing the state of a fuel cell vehicle of the third embodiment.

FIG. 11 is a timing chart illustrating the state of the fuel cell vehicle 10B of the third embodiment. FIG. 11 illustrates a time-series change of each of the driving force Fd and the braking force Fb of the fuel cell vehicle 10B, the lock prediction flag, the correction factor α, the maximum required power $P_{MAX}$, the vehicle required power $P_{VHCL}$, the FC generated power $P_{FC}$, and the ACP required driving power $P_{RQ}$. This example is based on the assumption that a driver lets up on an accelerator and starts to depress the brake at a time point T1. This example is further based on the assumption that the braking force Fb exceeds the driving force Fd at a time point T2 and that the vehicle stops at a time point T3. At the time point T2, the lock prediction flag is turned on, the correction factor α is reduced, and the maximum required power $P_{MAX}$ is reduced. This is because the maximum required power $P_{MAX}$ includes $\alpha*P_{win}$ (see the aforementioned formula (2)). In this way, reduction in the FC generated power $P_{FC}$ can be started before the motor is actually locked, so that overcharge of the secondary battery 140 can be unlikely.

Even in the aforementioned fuel cell vehicle 10B of this embodiment, if the T/M consumption power $P_{CONS}$ is to be reduced rapidly, the maximum required power $P_{MAX}$ is still reduced. Thus, the FC generated power $P_{FC}$ can be reduced readily. This can reduce overcharge of the secondary battery 140 that is to occur during rapid reduction of the T/M consumption power $P_{CONS}$. As a conventional matter, depressing a brake during acceleration of a fuel cell vehicle reduces the number of revolutions of the traction motor 136 rapidly, possibly causing overcharge of the secondary battery 140 with an excess of generated power. This is because, during rapid reduction in the T/M consumption power $P_{CONS}$, a delay to when the vehicle required power $P_{VHCL}$ (command power $P_{COM}$) is reduced is caused due to a delay in communication, for example. In this embodiment, when the braking force Fb exceeds the driving force Fd, the maximum required power $P_{MAX}$ is reduced to a value smaller than that of a case where the braking force Fb does not exceed the driving force Fd. Thus, the FC generated power $P_{FC}$ can be reduced readily. This can reduce overcharge of the secondary battery 140 that is to occur during rapid reduction of the T/M consumption power $P_{CONS}$.

D. Fourth Embodiment

Figure 12:
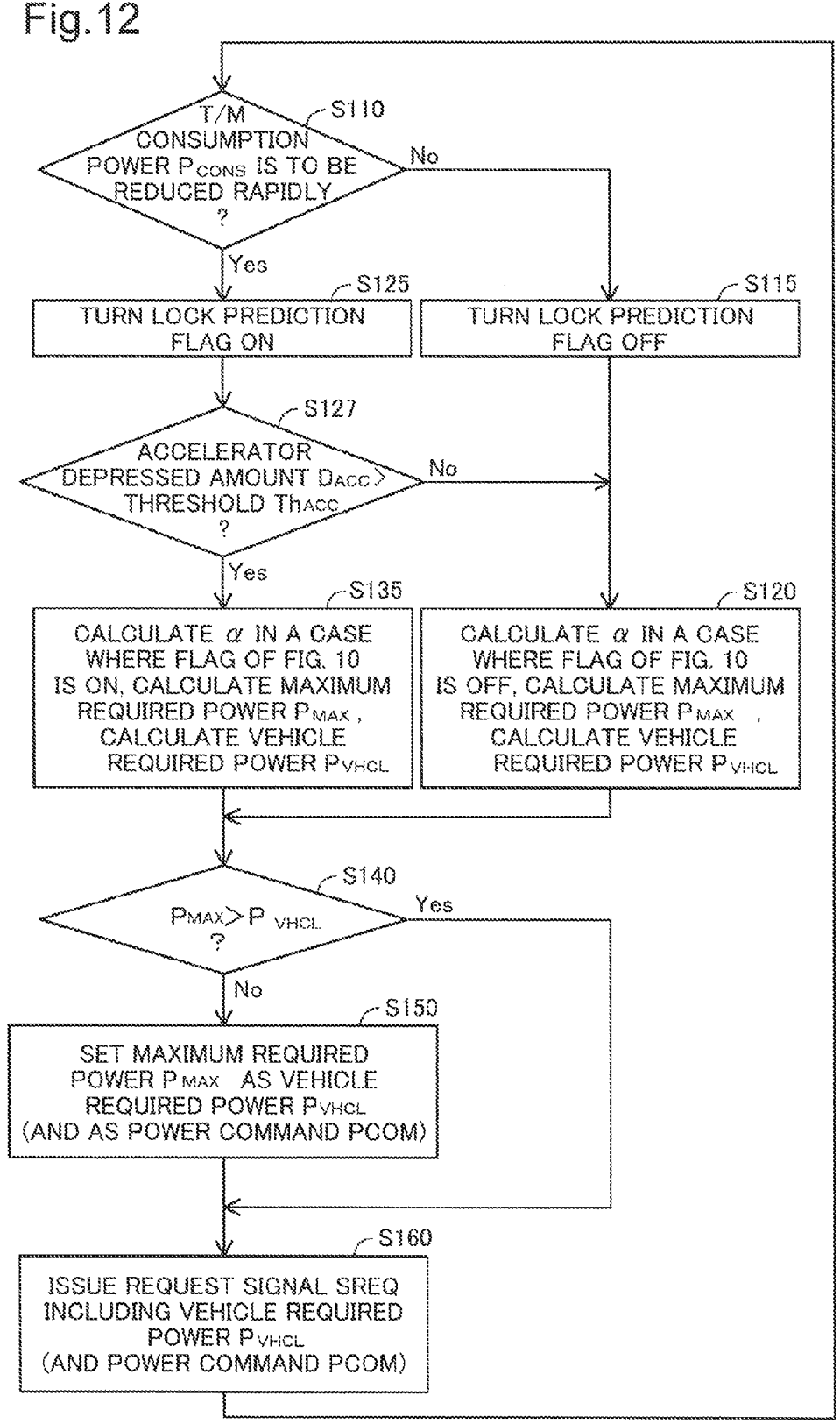
FIG. 12 is a flowchart illustrating correction factor setting control of a fourth embodiment.

FIG. 12 is a flowchart for explaining a correction factor setting control of a fourth embodiment. The correction factor setting control of the fourth embodiment differs from the correction factor setting control of the third embodiment (FIG. 9) in that it additionally includes a step S127. In step S127, the PM-ECU 181 determines whether the accelerator depressed amount $D_{ACC}$ is larger than a threshold $Th_{ACC}$. The threshold $Th_{ACC}$ mentioned herein is set to 10[%], for example. The threshold $Th_{ACC}$ may be a numerical value other than 10[%]. If the accelerator depressed amount $D_{ACC}$ is the same as or smaller than the threshold $Th_{ACC}$ (step S127: No), regardless of whether the lock prediction flag is on at this time, the PM-ECU 181 sets the correction factor α at a value of the case where the lock prediction flag is off (FIG. 10). Specifically, if the accelerator depressed amount $D_{ACC}$ is the same as or smaller than the threshold $Th_{ACC}$, the PM-ECU 181 does not reduce the correction factor α based on lock prediction. The accelerator depressed amount $D_{ACC}$ being the same as or smaller than the threshold $Th_{ACC}$ causes the risk of making the maximum required power $P_{MAX}$ fall below power to be generated for generating the high-potential evasion voltage. Thus, in this case, the high-potential evasion voltage can be generated by not reducing the correction factor α even if the lock prediction flag is on. According to a different example, if the accelerator depressed amount $D_{ACC}$ is the same as or smaller than the threshold $Th_{ACC}$, the value of the correction factor α may be smaller than a value of the case where the lock prediction flag is off, shown in FIG. 10, and larger than a value of the case where the lock prediction flag is on, shown in FIG. 10. This can make the occurrence of overcharge of the secondary battery 140 unlikely while evading a high potential.

Figure 13:
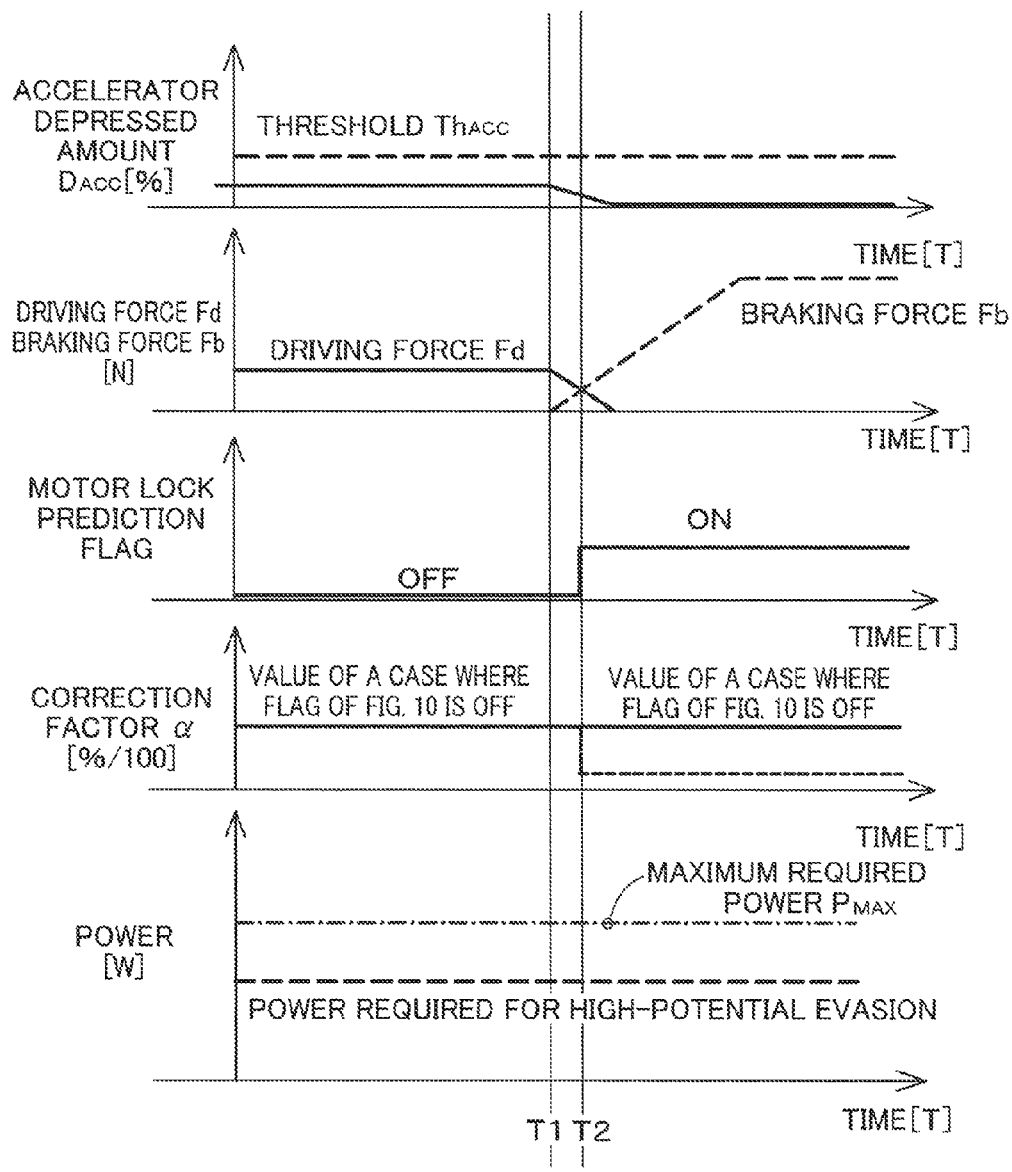
FIG. 13 is a timing chart showing the state of a fuel cell vehicle of the fourth embodiment.

FIG. 13 is a timing chart illustrating the state of a fuel cell vehicle 10C of the fourth embodiment. FIG. 13 illustrates a time-series change of each of the accelerator depressed amount $D_{ACC}$, the driving force Fd, the braking force Fb, the lock prediction flag, the correction factor α, and the maximum required power $P_{MAX}$. This example is based on the assumption that the accelerator depressed amount $D_{ACC}$ is smaller than the threshold $Th_{ACC}$, a driver lets up on an accelerator and starts to depress a brake at a time point T1, and the braking force Fb exceeds the driving force Fd at a time point T2. At the time point T2, the lock prediction flag becomes on while the correction factor α is not reduced. Thus, the value of the maximum required power $P_{MAX}$ is not reduced. This can make it unlikely that the maximum required power $P_{MAX}$ will fall below power to be generated for generating the high-potential evasion voltage.

E. Fifth Embodiment

Figure 14:
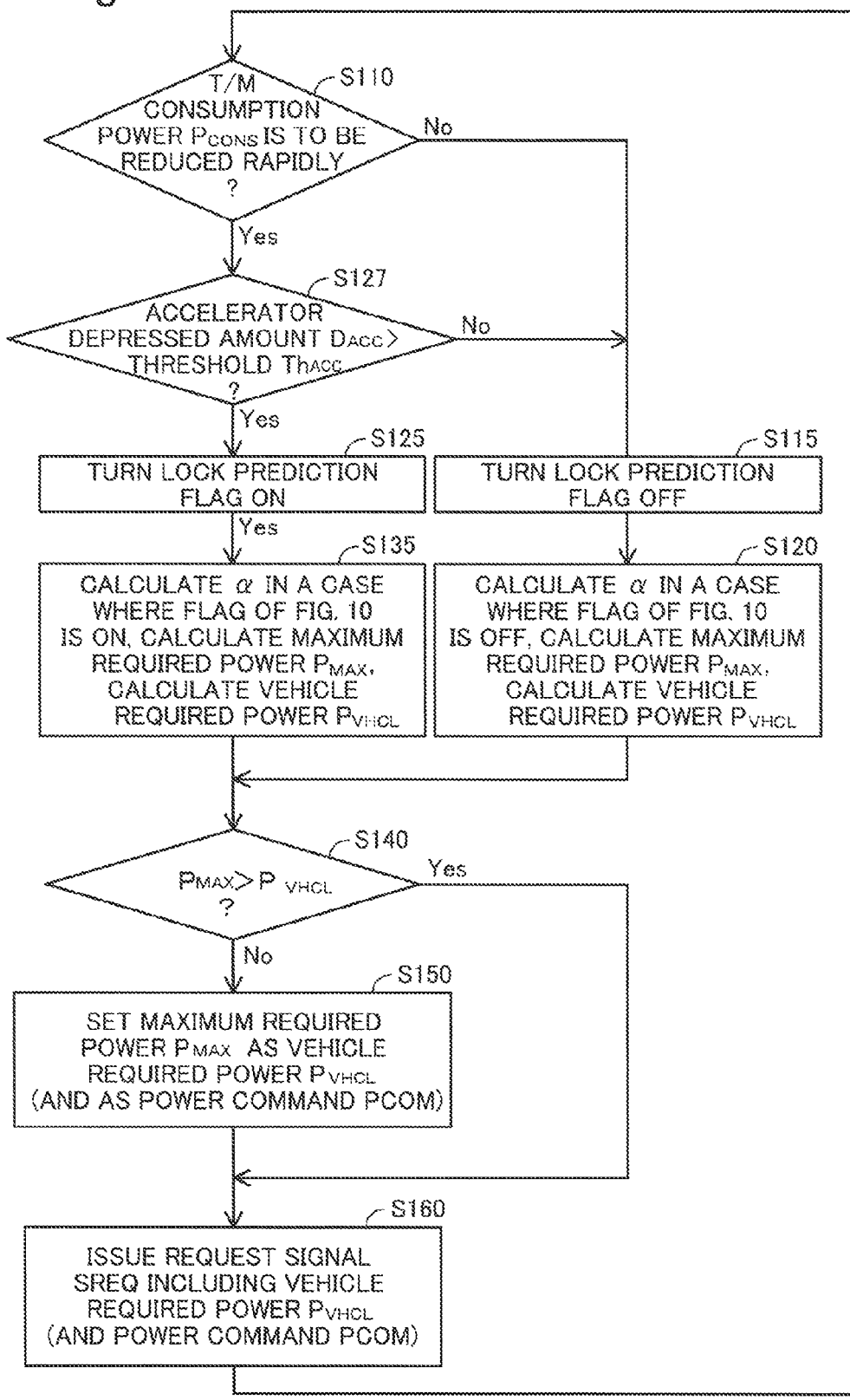
FIG. 14 is a flowchart illustrating correction factor setting control of a fifth embodiment.

FIG. 14 is a flowchart for explaining a correction factor setting control of a fifth embodiment. In comparison to the correction factor setting control of the fourth embodiment (FIG. 12), in the correction factor setting control of the fifth embodiment, step S127 is in an upstream position relative to step S125. In this configuration, even if the "predetermined condition" is satisfied (step S110: Yes), the lock prediction flag is not turned on if the accelerator depressed amount $D_{ACC}$ is the same as or smaller than the threshold $Th_{ACC}$ (step S127: No). Even in this case, the high-potential evasion voltage can still be generated by not reducing the correction factor α if the accelerator depressed amount $D_{ACC}$ is the same as or smaller than the threshold $Th_{ACC}$.

F. Modifications

This invention is not limited to the aforementioned embodiments but can be implemented in various aspects within a range that does not deviate from the spirit of this invention. As an example, in the aforementioned embodiments, the controller 180 may achieve some or all of the aforementioned functions and some or all of the aforementioned processes using software. Alternatively, the controller 180 may achieve some or all of these functions and some or all of these processes using hardware. Various types of circuitry are applicable as this hardware including an integrated circuit, a discrete circuit, and a circuit module using these circuits in combination. The following modifications are also feasible.

F-1. First Modification

In the aforementioned embodiments, the ACP required driving power $P_{RQ}$ is power required to place the ACP 138 in a driving state responsive to the required acceleration torque $T_{ACC}$. Alternatively, the ACP required driving power $P_{RQ}$ may include power not intended for driving the ACP 138, such as driving force for a valve.

F-2. Second Modification

In the aforementioned embodiments, the PM-ECU 181 compares the vehicle required power $P_{VHCL}$ (command power $P_{COM}$) and the maximum required power $P_{MAX}$ and determines whether the vehicle required power $P_{VHCL}$ does not exceed the maximum required power $P_{MAX}$. Alternatively, the PM-ECU 181 may not compare the vehicle required power $P_{VHCL}$ and the maximum required power $P_{MAX}$ but may issue the vehicle required power $P_{VHCL}$ and the maximum required power $P_{MAX}$ as the power command $P_{COM}$ to the FDC-ECU 183. Then, the FDC-ECU 183 may compare the vehicle required power $P_{VHCL}$ and the maximum required power $P_{MAX}$. Still alternatively, each of the PM-ECU 181 and the FDC-ECU 183 may compare the vehicle required power $P_{VHCL}$ and the maximum required power $P_{MAX}$.

F-3. Third Modification

In the correction factor setting control (FIG. 3) of the first and second embodiments, if the "predetermined condition" is determined to be satisfied in step S110, the correction factor α is set to zero (step S130). Alternatively, like in the third embodiment, if the "predetermined condition" is satisfied, the correction factor α may be reduced to a value smaller than that of the correction factor α in a case where the "predetermined condition" is not satisfied without being set to zero. Even in this case, the maximum required power $P_{MAX}$ can still be reduced if the "predetermined condition" is satisfied, thereby reducing the occurrence of overcharge of the secondary battery 140. Meanwhile, in the third embodiment, the correction factor α may be set to zero if the "predetermined condition" is determined to be satisfied.

F-4. Fourth Modification

In the correction factor setting control (FIG. 12) of the fourth embodiment, if the accelerator depressed amount $D_{ACC}$ is the same as or smaller than the threshold $Th_{ACC}$ (step S127: No), the correction factor α is not reduced based on lock prediction. Alternatively, even if the accelerator depressed amount $D_{ACC}$ is the same as or smaller than the threshold $Th_{ACC}$, the correction factor α may still be reduced based on lock prediction. It is preferable that the correction factor α in this case take on a value larger than that of the correction factor α of a case where the accelerator depressed amount $D_{ACC}$ is larger than the threshold $Th_{ACC}$ (when the "lock prediction flag is on" in FIG. 10). This can make the occurrence of overcharge of the secondary battery 140 unlikely while evading a high potential.

F-5. Fifth Modification

According to one embodiment of this invention, the controller 180 may determine whether a predetermined condition for rapid reduction in the T/M consumption power $P_{CONS}$ is satisfied. If determining that the predetermined condition is satisfied, the controller 180 may set the charging power $P_{chg}$ calculated based on the temperature and the state of charge of the secondary battery 140 to zero and calculate the vehicle required power $P_{VHCL}$ as $P_{T/M}+P_{AUX}+P_{chg}$. If determining that the predetermined condition is not satisfied, the controller 180 may calculate the vehicle required power $P_{VHCL}$ as $P_{T/M}+P_{AUX}+P_{chg}$ using the charging power $P_{chg}$ calculated based on the temperature and the state of charge of the secondary battery 140. Even in this case, if the T/M consumption power $P_{CONS}$ is to be reduced rapidly, the charging power $P_{chg}$ included in the vehicle required power $P_{VHCL}$ is still set to zero to reduce the vehicle required power $P_{VHCL}$. This can make the occurrence of overcharge of the secondary battery 140 unlikely.

What is claimed is:

1. A fuel cell system to be installed on a vehicle, the fuel cell system comprising:
    a fuel cell that supplies power to a motor that drives the vehicle;
    a secondary battery that supplies power to the motor;
    an SOC detector that detects a temperature and a state of charge of the secondary battery;
    an accelerator position detector that detects an accelerator depressed amount of the vehicle; and
    a controller that controls power to be generated by the fuel cell, wherein
    the controller comprises:
    a required generation power calculator that calculates required generation power to be issued as a command to the fuel cell based on the accelerator depressed amount and the temperature and the state of charge of the secondary battery; and
    a maximum required power calculator that calculates maximum required power capable of being generated by the fuel cell based on the accelerator depressed amount and the temperature and the state of charge of the secondary battery,
    the maximum required power includes allowable charging power calculated based on the temperature and the state of charge of the secondary battery and a correction factor,
    the controller determines whether a predetermined condition as a condition for rapid reduction in consumption power of the motor is satisfied,
    if determining that the condition is satisfied, the controller reduces the allowable charging power by making the correction factor smaller than the correction factor of a case where the condition is not satisfied and calculates the maximum required power,
    if determining that the condition is not satisfied, the controller increases the allowable charging power by making the correction factor larger than the correction factor of a case where the condition is satisfied and calculates the maximum required power, and
    if the calculated required generation power exceeds the calculated maximum required power, the controller makes the fuel cell generate power responsive to the calculated maximum required power.

2. The fuel cell system in accordance with claim 1, wherein the predetermined condition is satisfied if braking force of the vehicle generated by application of a brake becomes larger than driving force of the vehicle generated by the motor.

3. The fuel cell system in accordance with claim 2, wherein if the accelerator depressed amount is the same as or smaller than a predetermined value while the condition is determined to be satisfied, the controller makes the correction factor larger than the correction factor of a case where the accelerator depressed amount is larger than the predetermined value.

4. A vehicle comprising:
    the fuel cell system in accordance with claim 1; and
    a motor that drives the vehicle with power supplied from the fuel cell system.

5. A method of controlling a fuel cell system to be installed on a vehicle,
    the fuel cell system comprising a fuel cell that supplies power to a motor to drive the vehicle and a secondary battery that supplies power to the motor,
    the method comprising:
    detecting an accelerator depressed amount of the vehicle and a temperature and a state of charge of the secondary battery and calculating required generation power to be issued as a command to the fuel cell based on the accelerator depressed amount and the temperature and the state of charge of the secondary battery;
    calculating maximum required power capable of being generated by the fuel cell based on the accelerator depressed amount and the temperature and the state of charge of the secondary battery, the maximum required power including allowable charging power calculated based on the temperature and the state of charge of the secondary battery and a correction factor;
    determining whether a predetermined condition as a condition for rapid reduction in consumption power of the motor is satisfied;
    reducing the allowable charging power by making the correction factor smaller than the correction factor of a case where the condition is not satisfied and calculating the maximum required power if the condition is determined to be satisfied;
    increasing the allowable charging power by making the correction factor larger than the correction factor of a case where the condition is satisfied and calculating the maximum required power if the condition is determined not to be satisfied; and
    making the fuel cell generate power responsive to the calculated maximum required power if the calculated required generation power exceeds the calculated maximum required power.

6. The method of controlling the fuel cell system in accordance with claim 5, wherein the predetermined condition is satisfied if braking force of the vehicle generated by application of a brake becomes larger than driving force of the vehicle generated by the motor.

7. The method of controlling the fuel cell system in accordance with claim 6, wherein if the accelerator depressed amount is the same as or smaller than a predetermined value while the condition is determined to be satisfied, the correction factor is made larger than the correction factor of a case where the accelerator depressed amount is larger than the predetermined value.

* * * * *